US011550061B2

(12) United States Patent
Smith et al.

(10) Patent No.: US 11,550,061 B2
(45) Date of Patent: Jan. 10, 2023

(54) CONTROL OF AUTONOMOUS VEHICLE BASED ON ENVIRONMENTAL OBJECT CLASSIFICATION DETERMINED USING PHASE COHERENT LIDAR DATA

(71) Applicant: Aurora Innovation, Inc., Palo Alto, CA (US)

(72) Inventors: Warren Smith, McKees Rocks, PA (US); Ethan Eade, Pittsburgh, PA (US); Sterling J. Anderson, Sunnyvale, CA (US); James Andrew Bagnell, Pittsburgh, PA (US); Bartholomeus C. Nabbe, Palo Alto, CA (US); Christopher Paul Urmson, Los Altos, CA (US)

(73) Assignee: Aurora Operations, Inc., Mountain View, CA (US)

( * ) Notice: Subject to any disclaimer, the term of this patent is extended or adjusted under 35 U.S.C. 154(b) by 1018 days.

(21) Appl. No.: 16/173,648

(22) Filed: Oct. 29, 2018

(65) Prior Publication Data
US 2019/0317219 A1    Oct. 17, 2019

Related U.S. Application Data
(60) Provisional application No. 62/655,963, filed on Apr. 11, 2018.

(51) Int. Cl.
*G01S 17/931* (2020.01)
*G05D 1/00* (2006.01)
(Continued)

(52) U.S. Cl.
CPC .......... *G01S 17/931* (2020.01); *G05D 1/0088* (2013.01); *G05D 1/024* (2013.01);
(Continued)

(58) Field of Classification Search
CPC ..................... G01S 17/931; G06T 7/70; G06T 2207/10028; G06T 2207/30261; G06V 1/0088; G06V 1/024
(Continued)

(56) References Cited

U.S. PATENT DOCUMENTS 3,987,297 A    10/1976 Brienza et al.
6,175,799 B1    1/2001 Tsutsumi et al.
(Continued)

FOREIGN PATENT DOCUMENTS

CN    112041702    12/2020
EP    1298454 A2    4/2003
(Continued)

OTHER PUBLICATIONS

Barth, Alexander et al.; Where Will the Oncoming Vehicle be the Next Second? 2008 IEEE Intelligent Vehicles Symposium, Eindhoven University of Technology, Eindhoven, The Netherlands, Jun. 4-6, 2008, 6 pages, Downloaded on Jun. 18, 2010.
(Continued)

*Primary Examiner* — Yazan A Soofi
(74) *Attorney, Agent, or Firm* — Middleton Reutlinger

(57) ABSTRACT

Determining classification(s) for object(s) in an environment of autonomous vehicle, and controlling the vehicle based on the determined classification(s). For example, autonomous steering, acceleration, and/or deceleration of the vehicle can be controlled based on determined pose(s) and/or classification(s) for objects in the environment. The control can be based on the pose(s) and/or classification(s) directly, and/or based on movement parameter(s), for the object(s), determined based on the pose(s) and/or classification(s). In many implementations, pose(s) and/or classification(s) of environmental object(s) are determined based on data from a phase coherent Light Detection and Ranging (LIDAR) component
(Continued)

of the vehicle, such as a phase coherent LIDAR monopulse component and/or a frequency-modulated continuous wave (FMCW) LIDAR component.

25 Claims, 10 Drawing Sheets

(51) Int. Cl.
  *G05D 1/02* (2020.01)
  *G06T 7/70* (2017.01)
  *G06V 20/58* (2022.01)
(52) U.S. Cl.
  CPC ............... *G06T 7/70* (2017.01); *G06V 20/58* (2022.01); *G06T 2207/10028* (2013.01); *G06T 2207/30261* (2013.01)
(58) Field of Classification Search
  USPC .......................................................... 356/4
  See application file for complete search history.

(56) References Cited

U.S. PATENT DOCUMENTS

| | | | |
|---|---|---|---|
| 9,020,680 B2 | 4/2015 | Solyom et al. | |
| 9,606,539 B1 | 3/2017 | Kentley et al. | |
| 9,734,455 B2 | 8/2017 | Levinson et al. | |
| 9,940,834 B1 | 4/2018 | Konrardy et al. | |
| 10,007,269 B1 | 6/2018 | Gray | |
| 10,676,085 B2 | 6/2020 | Smith et al. | |
| 10,906,536 B2 | 2/2021 | Smith et al. | |
| 10,915,101 B2 | 2/2021 | Cohen | |
| 11,086,319 B2 | 8/2021 | Valois | |
| 2010/0052945 A1 | 3/2010 | Breed | |
| 2010/0198513 A1 | 8/2010 | Zeng et al. | |
| 2013/0190982 A1* | 7/2013 | Nakano ............... | B62D 15/025 701/41 |
| 2014/0324266 A1* | 10/2014 | Zhu ...................... | G01S 13/865 382/104 |
| 2014/0350768 A1 | 11/2014 | Filippov et al. | |
| 2014/0368493 A1 | 12/2014 | Rogan et al. | |
| 2015/0112550 A1* | 4/2015 | Cho ................... | B60G 17/0162 701/38 |
| 2016/0299228 A1 | 10/2016 | Maleki et al. | |
| 2017/0076227 A1* | 3/2017 | Elgie ................... | G05D 1/0011 |
| 2017/0123419 A1 | 5/2017 | Levinson et al. | |
| 2017/0270361 A1* | 9/2017 | Puttagunta ............ | G06V 20/56 |
| 2018/0053102 A1 | 2/2018 | Martinson et al. | |
| 2018/0060725 A1 | 3/2018 | Groh et al. | |
| 2018/0089538 A1 | 3/2018 | Graham et al. | |
| 2018/0136644 A1 | 5/2018 | Levinson et al. | |
| 2018/0188037 A1* | 7/2018 | Wheeler .......... | G08G 1/096827 |
| 2018/0260628 A1 | 9/2018 | Namiki et al. | |
| 2018/0307944 A1 | 10/2018 | Li et al. | |
| 2019/0012907 A1 | 1/2019 | Itahara | |
| 2019/0120967 A1* | 4/2019 | Smits ................. | G01C 21/3626 |
| 2019/0164049 A1 | 5/2019 | Bai et al. | |
| 2019/0180451 A1* | 6/2019 | Kellner ................ | G06T 7/285 |
| 2019/0302269 A1 | 10/2019 | Singer et al. | |
| 2019/0315351 A1 | 10/2019 | Smith et al. | |
| 2019/0317217 A1* | 10/2019 | Day ........................ | G01S 17/58 |
| 2019/0317219 A1* | 10/2019 | Smith .................... | G01S 17/931 |
| 2019/0318206 A1* | 10/2019 | Smith .................... | G01S 17/58 |
| 2020/0142408 A1 | 5/2020 | Valois et al. | |
| 2020/0142409 A1* | 5/2020 | Valois ................... | G05D 1/027 |
| 2020/0142422 A1 | 5/2020 | Valois et al. | |
| 2020/0209867 A1 | 7/2020 | Valois et al. | |
| 2020/0210777 A1* | 7/2020 | Valois .................... | G06V 20/56 |
| 2021/0146932 A1 | 5/2021 | Smith et al. | |

FOREIGN PATENT DOCUMENTS

| | | |
|---|---|---|
| EP | 1531343 A1 | 5/2005 |
| EP | 3285230 A1 | 2/2018 |
| EP | 3477616 A1 | 5/2019 |
| WO | 2014168851 A1 | 10/2014 |
| WO | 2018055378 | 3/2018 |
| WO | 2019199473 | 10/2019 |
| WO | 2019199474 | 10/2019 |
| WO | 2019199475 | 10/2019 |
| WO | 2020091833 | 5/2020 |
| WO | 2020091834 | 5/2020 |
| WO | 2020091835 | 5/2020 |

OTHER PUBLICATIONS

Carlson, Christopher R., et al.; Practical Position and Yaw Rate Estimation with GPS and Differential Wheelspeeds, Mechanical Engineering, Standford, CA, 8 pages, Oct. 30, 2014.
Kellner, Dominik, et al.; Instantaneous Full-Motion Estimation of Arbitrary Objects using Dual Doppler Radar, driveU, Institute of Measurement, Control and Microtechnology Ulm, Germany, 6 pages, Jun. 29, 2016.
Kellner, Dominik, et al.; Tracking of Extended Objects with High-Resolution Doppler Radar, driveU, Institute of Measurement, Control and Microtechnology Ulm, Germany, 13 pages, Nov. 23, 2015.
Mukhtar, Amir, et al.; Vehicle Detection Techniques for Collision Avoidance Systems: A Review, IEEE Transactions on Intelligent Transportation Systems, vol. 16, No. 5, 21 pages, Oct. 2015.
International Searching Authority; International Search Report and Written Opinion of the International Searching Authority of PCT application No. PCT/US2019/024671; 14 pages; dated Oct. 11, 2019.
United States Patent and Trademark Office, Office Action for U.S. Appl. No. 16/173,669 dated Jan. 14, 2020.
Korean Intellectual Property Office, Notice of Preliminary Rejection in app. No. 10-2020-7031853 dated Feb. 21, 2022.
Khuon, Timothy et al.: "Distributed adaptive spectral and spatial sensor fusion for super-resolution classification", Applied Imagery Pattern Recognition Workshop (AIPR), 2012 IEEE, IEEE, pp. 1-8, XP032422650; dated Oct. 9, 2012.
United States Patent and Trademark Office, Notice of Allowance for U.S. Appl. No. 16/173,669 dated Mar. 25, 2020.
United States Patent and Trademark Office, Office Action for U.S. Appl. No. 16/173,660 dated Jun. 24, 2020.
Chinese Application No. 201980024172.3 entered national stage Sep. 30, 2020.
Chinese Application No. 201980024410.0 entered national stage Sep. 30, 2020.
Korean Patent App. No. 10-10-2020-7031846 entered national stage Nov. 4, 2020.
Korean Patent App. No. 10-10-10-2020-7031853 entered national stage Nov. 4, 2020.
European Patent App. No. 19744897.0 entered national stage Nov. 9, 2020.
European Patent App. No. 19722966.9 entered national stage Nov. 9, 2020.
Japanese Patent App. No. 2020-555890 entered national stage Oct. 7, 2020.
United States Patent and Trademark Office, Notice of Allowance for U.S. Appl. No. 16/173,660 dated Oct. 15, 2020.
United States Patent and Trademark Office, Office Action for U.S. Appl. No. 16/271,401 dated Nov. 27, 2020.
United States Patent and Trademark Office, Notice of Allowance for U.S. Appl. No. 16/173,660 dated Nov. 27, 2020.
Dresner, et al.; A Multiagent Approach to Autonomous Intersection Management, Journal of Artificial Intelligence Research 31 (2008) 591-656, Mar. 2008.
Cortica Automotive; It's Not Enough to Recognize A Traffic Light 99% of the Time, http://www.cortica.com/automotive/index.html, Jun. 5, 2018.
Bojarski, et al.; End to End Learning for Self-Driving Cars, Apr. 25, 2016.
Michels, Jeff, et al.; High Speed Obstacle Avoidance using Monocular Vision and Reinforcement Learning, Computer Science Department, Stanford University, Proceedings of the 22nd International Conference on Machine Learning, Bonn, Germany, 2005.

(56) References Cited

OTHER PUBLICATIONS

Dresner, Kurt, et al.; Stone P. (2006) Multiagent Traffic Management: Opportunities for Multiagent Learning. In: Tuyls K., Hoen P.J., Verbeeck K., Sen S. (eds) Learning and Adaption in Multi-Agent Systems. LAMAS 2005. Lecture Notes in Computer Science, vol. 3898. Springer, Berlin, Heidelberg.
Pongpunwattana, Anawat, et al.; (2004). Real-Time Planning for Multiple Autonomous Vehicles in Dynamic Uncertain Environments. Journal of Aerospace Computing Information and Communication—J Aerosp Comput Inf Commun. 1. 580-604. 10.2514/1.12919.
Roderick, Norman, et al. (2002); Reinforcement Learning for Autonomous Vehicles.
Desjardins, C. et al.; Cooperative Adaptive Cruise Control: A Reinforcement Learning Approach; IEEEE, vol. 12, No. 4; pp. 1248-1260; dated Dec. 2011.
Ye, H. et al.: Machine LEarning for Vehicular Networks: Recent Advances and Application Examples; IEEE, vol. 13, No. 2; pp. 94-101; dated Jun. 1, 2018.

\* cited by examiner

CONTROL OF AUTONOMOUS VEHICLE BASED ON ENVIRONMENTAL OBJECT CLASSIFICATION DETERMINED USING PHASE COHERENT LIDAR DATA

BACKGROUND

As computing and vehicular technologies continue to evolve, autonomy-related features have become more powerful and widely available, and capable of controlling vehicles in a wider variety of circumstances. For automobiles, for example, the Society of Automotive Engineers (SAE) has established a standard (J3016) that identifies six levels of driving automation from "no automation" to "full automation". The SAE standard defines Level 0 as "no automation" with full-time performance by the human driver of all aspects of the dynamic driving task, even when enhanced by warning or intervention systems. Level 1 is defined as "driver assistance", where a vehicle controls steering or acceleration/deceleration (but not both) in at least some driving modes, leaving the operator to perform all remaining aspects of the dynamic driving task. Level 2 is defined as "partial automation", where the vehicle controls steering and acceleration/deceleration in at least some driving modes, leaving the operator to perform all remaining aspects of the dynamic driving task. Level 3 is defined as "conditional automation", where, for at least some driving modes, the automated driving system performs all aspects of the dynamic driving task, with the expectation that the human driver will respond appropriately to a request to intervene. Level 4 is defined as "high automation", where, for only certain conditions, the automated driving system performs all aspects of the dynamic driving task even if a human driver does not respond appropriately to a request to intervene. The certain conditions for Level 4 can be, for example, certain types of roads (e.g., highways) and/or certain geographic areas (e.g., a geofenced metropolitan area which has been adequately mapped). Finally, Level 5 is defined as "full automation", where a vehicle is capable of operating without operator input under all conditions.

A fundamental challenge of any autonomy-related technology relates to collecting and interpreting information about a vehicle's surrounding environment, along with planning and executing commands to appropriately control vehicle motion to safely navigate the vehicle through its current environment. Therefore, continuing efforts are being made to improve each of these aspects, and by doing so, autonomous vehicles increasingly are able to reliably operate in increasingly complex environments and accommodate both expected and unexpected interactions within an environment.

SUMMARY

In some implementations, a method is provided that includes receiving, from a phase coherent Light Detection and Ranging (LIDAR) component of a vehicle, a group of phase coherent LIDAR data points collectively capturing a plurality of points in an area of an environment of the vehicle. Each of the phase coherent LIDAR data points of the group indicate a corresponding range and a corresponding velocity for a corresponding one of the points in the environment, and each of the phase coherent LIDAR data points of the group are generated based on a corresponding sensing event of the phase coherent LIDAR component. The method further includes determining that a subgroup, of the phase coherent LIDAR data points of the group, corresponds to an object of a particular classification. Determining that the subgroup corresponds to the object of the particular classification is based on both: the corresponding ranges for multiple of the phase coherent LIDAR data points of the subgroup, and the corresponding velocities for multiple of the phase coherent LIDAR data points of the subgroup. The method further includes adapting autonomous control of the vehicle based on determining that the subgroup corresponds to the object of the particular classification.

These and other implementations of the technology described herein can include one or more of the following features.

In some implementations, the method further includes determining at least one instantaneous velocity of the object based on at least one of the corresponding velocities of the subgroup. The at least one of the corresponding velocities of the subgroup is utilized in determining the at least one instantaneous velocity of the object based on the determining that the subgroup corresponds to the object. Adapting autonomous control of the vehicle can be further based on the at least one instantaneous velocity. In some versions of those implementations, determining the at least one instantaneous velocity based on the at least one of the corresponding velocities of the subgroup includes determining the at least one instantaneous velocity based on a function of a plurality of the corresponding velocities of the subgroup. In some additional or alternative versions of those implementations, adapting autonomous control of the vehicle based on the at least one instantaneous velocity includes: determining at least one candidate trajectory of the object based on the at least one instantaneous velocity; and adapting autonomous control of the vehicle based on the at least one candidate trajectory. Determining the at least one candidate trajectory of the object based on the at least one instantaneous velocity can optionally include: adapting a previously determined velocity, for the object, based on the at least one instantaneous velocity; and determining the at least one candidate trajectory of the object based on the adaptation of the previously determined velocity. In some additional or alternative versions where the at least one instantaneous velocity is determined, determining the at least one instantaneous velocity based on the at least one of the corresponding velocities of the subgroup includes: selecting an instantaneous velocity determination technique, from a plurality of candidate instantaneous velocity determination techniques; and using the selected instantaneous velocity determination technique in determining the at least one instantaneous velocity. In some of those versions, selecting the instantaneous velocity determination technique from the plurality of candidate instantaneous velocity determination techniques is based on the instantaneous velocity determination technique being assigned to the particular classification and/or is based on a quantity of the corresponding velocities of the subgroup.

In some implementations, each of the phase coherent LIDAR data points of the group further indicate a corresponding intensity, and determining that the subgroup of the phase coherent LIDAR data points of the group corresponds to the object of the particular classification is further based on the corresponding intensities for multiple of the phase coherent LIDAR data points of the subgroup.

In some implementations, the method further includes: receiving, from the phase coherent LIDAR component immediately prior to receiving the group, a prior group of prior phase coherent LIDAR data points that collectively capture a plurality of the points in the area of an environment of the vehicle. Each of the prior phase coherent LIDAR data points of the prior group indicate a corresponding prior range and a corresponding prior velocity for the corresponding points in the environment, and each of the prior phase coherent LIDAR data points of the prior group are generated based on a prior corresponding sensing event of the phase coherent LIDAR component. In some of those implementations, determining that the subgroup, of the phase coherent LIDAR data points of the group, corresponds to the object of the particular classification is further based on both: the corresponding prior ranges for multiple of the prior phase coherent LIDAR data points, and the corresponding velocities for multiple of the prior phase coherent LIDAR data points.

In some implementations, determining that the subgroup, of the phase coherent LIDAR data points of the group, corresponds to the object of the particular classification includes: processing the phase coherent LIDAR data points of the group using a trained machine learning model (e.g., a neural network model including one or more convolution layers); generating, based on processing of the phase coherent LIDAR data points of the group using the trained machine learning model, an output that indicates that the subgroup has the particular classification; and determining that the subgroup corresponds to the object having the particular classification based on the output indicating that the subgroup has the particular classification. In some versions of those implementations, the output indicates, for each of a plurality of spatial regions of the phase coherent LIDAR data points of the group, a corresponding probability that the corresponding spatial region has the particular classification. In some of those versions, determining that the subgroup corresponds to the object having the particular classification based on the output indicating that the subgroup has the particular classification includes: determining a set of one or more of the spatial regions based on the corresponding probabilities of the spatial regions of the set each satisfying a threshold; and determining the subgroup based on the subgroup corresponding to the set of the one or more of the spatial regions. The spatial regions indicated by the output can each correspond to one or more of the phase coherent LIDAR data points of the group. For example, the spatial regions can each correspond to a corresponding single one of the phase coherent LIDAR data points of the group, or can each correspond to a corresponding unique grouping of two or more of the phase coherent LIDAR data points of the group. In some additional or alternative versions of implementations wherein the output indicates that the subgroup has the particular classification, the output indicates, for each of a plurality of spatial regions of the phase coherent LIDAR data points of the group, a corresponding first probability that the corresponding spatial region has the particular classification and a corresponding additional probability that the corresponding spatial region has a distinct particular classification. In those additional or alternative implementations, determining that the subgroup corresponds to the object having the particular classification based on the output indicating that the subgroup has the particular classification includes: determining a set of one or more of the spatial regions based on the corresponding probabilities of the spatial regions of the set each satisfying a threshold; and determining the subgroup based on the subgroup corresponding to the set of the one or more of the spatial regions. In some of those additional or alternative implementations, the method further includes: determining that an additional subgroup of the phase coherent LIDAR data corresponds to an additional object having the distinct particular classification based on: determining an additional set of one or more of the spatial regions based on the corresponding additional probabilities of the spatial regions of the additional set each satisfying a threshold; and determining the additional subgroup based on the additional subgroup corresponding to the additional set of the one or more of the spatial regions. Adapting autonomous control of the vehicle can be further based on determining that the additional subgroup corresponds to the additional object having the distinct particular classification.

In some implementations, determining that the subgroup, of the phase coherent LIDAR data points of the group, corresponds to the object of the particular classification includes determining that the phase coherent LIDAR data points of the subgroup satisfy a difference criterion relative to a reference group of phase coherent LIDAR data points defined for the particular classification.

In some implementations, adapting autonomous control of the vehicle based on determining that the subgroup corresponds to the object of the particular classification includes altering a velocity of the vehicle and/or a direction of the vehicle.

In some implementations, adapting autonomous control of the vehicle based on determining that the subgroup corresponds to the object of the particular classification includes: determining a pose of the object based on the phase coherent LIDAR data points of the subgroup; and adapting autonomous control based on the pose of the object and based on the particular classification of the object.

In some implementations, adapting autonomous control of the vehicle based on determining that the subgroup corresponds to the object of the particular classification includes: determining that the object is mobile based on the particular classification; determining a pose of the object based on the phase coherent LIDAR data points of the subgroup; determining, in response to determining that the object is mobile, at least one candidate trajectory for the object based on the pose of the object; and adapting autonomous control of the vehicle based on the at least one candidate trajectory. In some versions of those implementations, the method further includes determining an instantaneous velocity of the object based on the phase coherent LIDAR data points of the subgroup. In those versions, determining the at least one candidate trajectory for the object can be further based on the instantaneous velocity of the object.

In some implementations, the group of phase coherent LIDAR data points includes a three-dimensional point cloud.

In some implementations, the phase coherent LIDAR component is a phase coherent LIDAR monopulse component and the corresponding sensing events of the phase coherent LIDAR component each include a first receiver sensing event at a first receiver of the phase coherent LIDAR monopulse component and a second receiver sensing event at a second receiver of the phase coherent LIDAR monopulse component.

In some implementations, the phase coherent LIDAR component is a frequency-modulated continuous wave (FMCW) LIDAR component.

In some implementations, a method is provided that includes: receiving, from a phase coherent LIDAR component of a vehicle, phase coherent LIDAR data capturing an environment of the vehicle. The phase coherent LIDAR data indicates, for each of a plurality of points in the environment of the vehicle, at least one corresponding range, at least one corresponding velocity, and at least one corresponding intensity based on a corresponding sensing event of the phase coherent LIDAR component. The method further includes determining that a subgroup, of the phase coherent LIDAR data, corresponds to an object of a particular classification. Determining that the subgroups corresponds to an object of a particular classification is based on: the corresponding ranges for the phase coherent LIDAR data of the subgroup, the corresponding velocities for the phase coherent LIDAR data of the subgroup, and the corresponding intensities for the phase coherent LIDAR data of the subgroup. The method further includes autonomously controlling the vehicle based on determining that the subgroup corresponds to the object of the particular classification.

These and other implementations of the technology described herein can include one or more of the following features.

In some implementations, the method further includes determining at least one instantaneous velocity of the object based on at least one of the corresponding velocities of the subgroup. The at least one of the corresponding velocities of the subgroup is utilized in determining the at least one instantaneous velocity of the object based on the determining that the subgroup corresponds to the object. Autonomously controlling the vehicle can be further based on the at least one instantaneous velocity. In some versions of those implementations, determining the at least one instantaneous velocity based on the at least one of the corresponding velocities of the subgroup includes determining the at least one instantaneous velocity based on a function of a plurality of the corresponding velocities of the subgroup. In some additional or alternative versions of those implementations, autonomously controlling the vehicle based on the at least one instantaneous velocity includes: determining at least one candidate trajectory of the object based on the at least one instantaneous velocity; and autonomously controlling the vehicle based on the at least one candidate trajectory.

In some implementations, the method further includes receiving, from the phase coherent LIDAR component prior to receiving the phase coherent LIDAR data, a prior instance of phase coherent LIDAR data. The prior instance of phase coherent LIDAR data indicates, for each of a plurality of the points in the environment of the vehicle, at least one corresponding prior range, at least one corresponding prior intensity, and at least one corresponding prior velocity based on a corresponding prior sensing event of the phase coherent LIDAR component/In those implementations, determining that the subgroup, of the phase coherent LIDAR data of the group, corresponds to the object of the particular classification is further based on both: a plurality of the corresponding prior ranges of the prior phase coherent LIDAR data, and a plurality of the corresponding prior velocities of the prior phase coherent LIDAR data.

In some implementations, determining that the subgroup, of the phase coherent LIDAR data, corresponds to the object of the particular classification includes: processing the phase coherent LIDAR data using a trained machine learning model; generating, based on processing of the phase coherent LIDAR data using the trained machine learning model, an output that indicates that the subgroup has the particular classification; and determining that the subgroup corresponds to the object having the particular classification based on the output indicating that the subgroup has the particular classification.

In some implementations, the phase coherent LIDAR data includes a range-Doppler image.

In some implementations, the phase coherent LIDAR data includes an intermediate frequency waveform generated based on mixing of a local optical oscillator with time delayed reflections during the corresponding sensing events.

In some implementations, the phase coherent LIDAR component is a phase coherent LIDAR monopulse component including at least a first coherent receiver and a second coherent receiver. In some of those implementations, the corresponding sensing events of the phase coherent LIDAR component each include a first receiver sensing event at a first receiver of the phase coherent LIDAR monopulse component and a second receiver sensing event at a second receiver of the phase coherent LIDAR monopulse component. In some versions of those implementations, the corresponding sensing events of the phase coherent LIDAR component further include a third receiver sensing event at a third receiver of the phase coherent LIDAR monopulse component.

In some implementations, the phase coherent LIDAR component is a frequency-modulated continuous wave (FMCW) LIDAR component.

In some implementations, a method is provided that includes receiving, from a phase coherent LIDAR monopulse component of a vehicle, phase coherent LIDAR monopulse data capturing an environment of the vehicle. The phase coherent LIDAR monopulse component includes a laser source and at least a first coherent receiver and a second coherent receiver. The phase coherent LIDAR monopulse data indicates, for each of a plurality of points in the environment of the vehicle, at least one corresponding range and at least one corresponding velocity based on a corresponding sensing event of the phase coherent LIDAR monopulse component. The corresponding sensing events of the phase coherent LIDAR component each include a first receiver sensing event at the first receiver and a second receiver sensing event at the second receiver (and optionally further receiver sensing event(s) at further receiver(s)). The method further includes determining that a subgroup, of the phase coherent LIDAR data, corresponds to an object of a particular classification. Determining that the subgroup corresponds to an object of the particular classification is based on: the corresponding ranges for the phase coherent LIDAR monopulse data of the subgroup, and the corresponding velocities for the phase coherent LIDAR monopulse data of the subgroup. The method further includes autonomously controlling the vehicle based on determining that the subgroup corresponds to the object of the particular classification.

In some implementations, a method is provided that includes receiving, from a phase coherent LIDAR component of a vehicle, a group of phase coherent LIDAR data points collectively capturing a plurality of points in an area of an environment of the vehicle. Each of the phase coherent LIDAR data points of the group indicates a corresponding range and a corresponding velocity for a corresponding one of the points in the environment, and each is generated based on a corresponding sensing event of the phase coherent LIDAR component. The method further includes determining that a subgroup, of the phase coherent LIDAR data points of the group, corresponds to an object of a particular classification. Determining that the subgroup corresponds to an object of the particular classification is based on both: the corresponding ranges for multiple of the phase coherent LIDAR data points of the subgroup, and the corresponding velocities for multiple of the phase coherent LIDAR data points of the subgroup. The method further includes determining a multi-dimensional pose of the object based on the subgroup of the phase coherent LIDAR data points of the group, and providing the determined multi-dimensional pose and an indication of the particular classification to a planning subsystem of the vehicle.

These and other implementations of the technology described herein can include one or more of the following features.

In some implementations, the multi-dimensional pose is a six-dimensional pose that indicates position and orientation of the object.

In some implementations, the multi-dimensional pose is a three-dimensional pose that indicates position of the object.

In some implementations, the method further includes generating, by the planning subsystem, a trajectory of the vehicle based on the particular classification.

In some implementations, the phase coherent LIDAR component is a frequency-modulated continuous wave (FMCW) LIDAR component.

In addition, some implementations include an autonomous vehicle with one or more processors that are operable to execute instructions stored in associated memory, and where the instructions are configured to cause performance of any of the methods described herein. Some implementations additionally or alternatively include one or more non-transitory computer readable storage media storing computer instructions executable by one or more processors to perform any of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
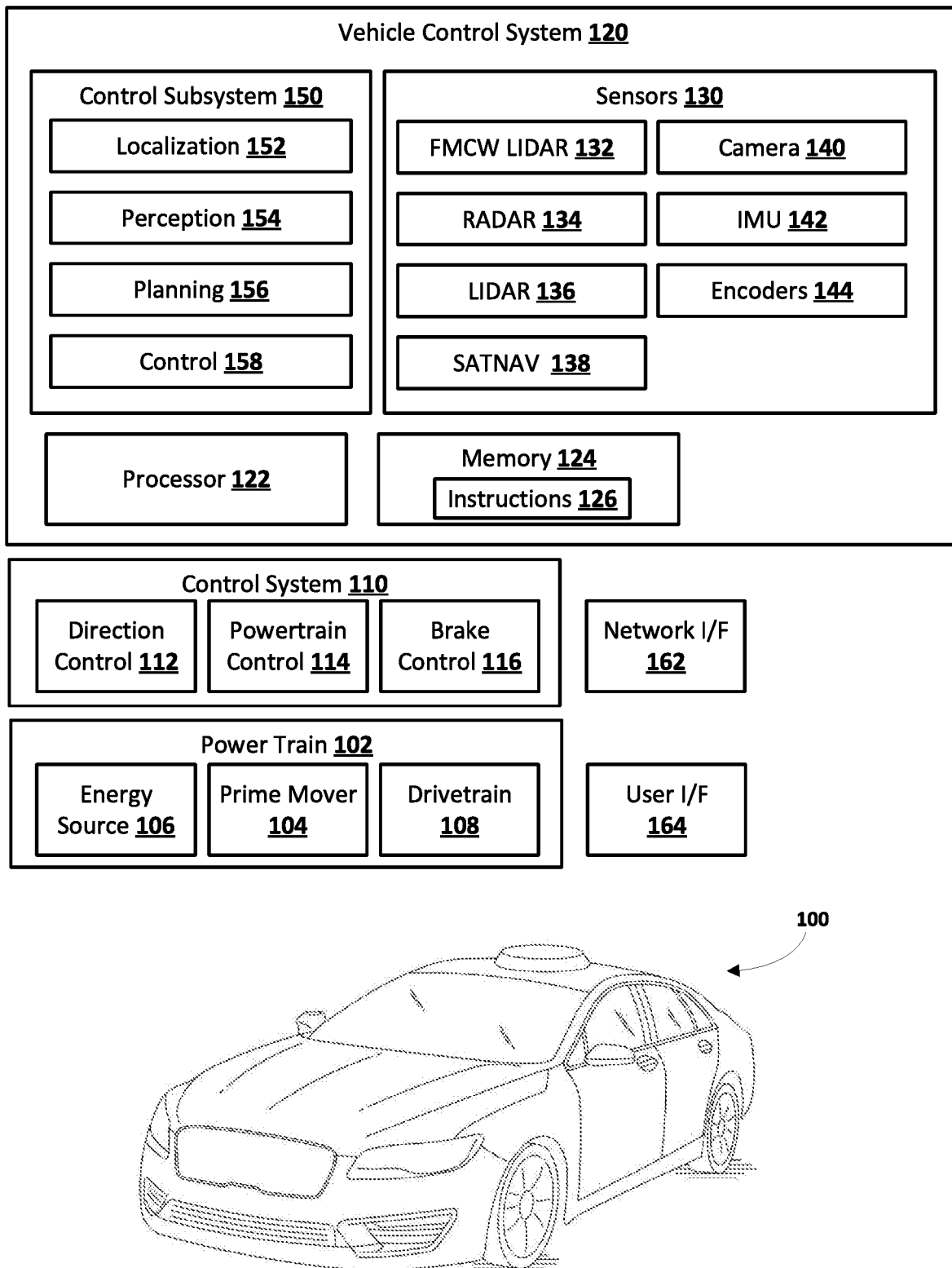
FIG. 1 illustrates an example environment in which implementations disclosed herein can be implemented.

In various levels of autonomous control of a vehicle (e.g., any of SAE Levels 1-5 described above), it is necessary to determine various parameters of the so-called ego vehicle (i.e., the vehicle being autonomously controlled, hereinafter also referred to as the "vehicle" for brevity)—and to adapt autonomous control of the ego vehicle based on the various determined parameters of the ego vehicle itself. In various levels of autonomous control of the ego vehicle, it is also desirable and/or necessary to determine various parameters of additional object(s) that are in the environment of the ego vehicle and that are in addition to the ego vehicle. For example, it can be necessary to determine the pose (position and optionally orientation) of various object(s) in the environment and/or the classification(s) of those object(s). Moreover, for at least some objects it can be desirable to determine movement parameter(s) for those objects such as velocity, acceleration, a candidate trajectory (which can be based on velocity and/or acceleration), etc. For instance, at each of multiple iterations, a trajectory of the ego vehicle can be determined based at least in part on various parameters of object(s) in the ego vehicle's environment, such as pose(s), classification(s), and/or movement parameter(s) (if any) of the object(s). The trajectory can be determined so as to prevent the ego vehicle from contacting and/or being too proximal to any of the object(s).

Implementations disclosed herein are generally directed to determining classification(s) for object(s) in an environment of a vehicle, and controlling the vehicle based on the determined classification(s). For example, autonomous steering, acceleration, and/or deceleration of the vehicle can be adapted based on the determined classification(s) of the additional object(s). For instance, steering and/or acceleration/deceleration parameters determined for a vehicle based on a first environmental object that is determined to be a pedestrian can be different from those determined had the object instead been determined to be an additional vehicle.

In some implementations, a determined pose of an object and a determined classification of the object can be utilized in controlling the vehicle. As one example, if a determined pose of an object is not within (or within a threshold distance of) a current intended path of a vehicle, and the object is determined to have a classification that indicates the object is immobile (e.g., a tree classification), that object can optionally be ignored in determining whether control of the vehicle needs to be adapted. On the other hand, if a determined pose of an object is within (or within a threshold distance of) a current intended path of the vehicle and has a classification that indicates the object is mobile (e.g., vehicle, pedestrian, cyclist, or animal classification), that object can be utilized in determining whether control of the vehicle needs to be adapted.

Further, in some of those implementations, movement parameter(s) for an object (which can optionally be determined based on its classification) can be determined and utilized in controlling the vehicle. For example, velocity and/or acceleration of an object can be utilized to generate a candidate trajectory for the object, and the vehicle controlled based on the candidate trajectory such that the vehicle adapts its own trajectory to avoid being too proximal to the candidate trajectory of the object. How proximal is too proximal can optionally be dependent on, for example, the classification of the object. For example, any value less than 1.0 meter for an object with a bicyclist classification can be too close when the trajectories are substantially parallel, whereas only values less than 0.7 meters for an object with a vehicle classification can be too close when the trajectories are substantially parallel.

In many implementations disclosed herein, poses and classifications of environmental objects are determined based on data from a phase coherent Light Detection and Ranging (LIDAR) component of the vehicle. Moreover, in some of those implementations, velocities and optionally accelerations of the environmental objects are also determined based on the same data from the phase coherent LIDAR component.

Data from a phase coherent LIDAR component of a vehicle is referred to herein as "phase coherent LIDAR data". As described herein, phase coherent LIDAR data can indicate, for each of a plurality of points in an environment, at least a range for the point and a velocity for the point. The range for a point indicates distance to the point from receiver(s) of the phase coherent LIDAR component. The velocity for the point indicates a magnitude (and optionally a direction) of the velocity for the point. The indicated range and velocity for a point is based on a corresponding sensing event of the phase coherent LIDAR component. Accordingly, through sensing events of a sensing cycle, phase coherent LIDAR data indicating instantaneous ranges and instantaneous velocities for a large quantity of points in the environment can be determined. Implementations disclosed herein can determine, based on the instantaneous ranges and instantaneous velocities indicated by at least some of the FMCW LIDAR data, a pose and classification for an object, as well as optionally an instantaneous velocity for the object. In those implementations where an instantaneous velocity for an object is determined based on phase coherent LIDAR data of a sensing cycle, the instantaneous velocity indicates velocity of the object during the sensing cycle, without requiring reference to phase coherent LIDAR data from future sensing cycle(s). This enables quick resolution of an instantaneous velocity of the object, and resultantly enables quick determination of whether adaptation of control of the vehicle is needed in view of the instantaneous velocity (and quick adaptation when it is determined adaptation is needed).

Generally, LIDAR is a technique that uses reflections of electromagnetic waves in the optical spectra to determine ranges of points in an environment. For example, some LIDAR implementations determine the ranges of the points based on measuring the round-trip delay of light pulses to the points. A LIDAR component can include a light source (e.g., a laser) for generating light pulses in the optical spectra, optics (e.g., mirrors) for directing the light source (e.g., to scan the azimuth and elevation), a sensor for measuring reflected pulses, and local processor(s) and/or other electronic components for processing the reflected pulses. The reflected pulses can be processed to determine ranges to points of target(s) in the environment based on time delay between transmitted and reflected pulses (and using the speed of light). In some implementations, LIDAR components generate output, based on the processing, that is a three-dimensional (3D) point cloud with intensity values (based on the intensity of the reflected pulses).

Generally, phase coherent LIDAR is a technique that uses reflections of electromagnetic waves in the optical spectra to determine data that indicates ranges and velocities of points in an environment. A phase coherent LIDAR component includes at least one tunable laser (or other light source) that generates a waveform, and includes at least one receiver, such as a coherent optical receiver. The phase coherent LIDAR component can also include one or more components for directing the tunable laser, such as optics that can be utilized to direct (in azimuth and/or elevation) the waveform from the tunable laser to a plurality of points in an environment. Further, the phase coherent LIDAR component can include local processor(s) and/or other electronic components for processing reflections of the waveform. The tunable laser of a phase coherent LIDAR component is tunable in that it can be controlled so that the waveform it generates is encoded by modifying one or more properties of the waveform across the waveform. The tunable laser can be controlled to generate one or more of various types of encoded waveforms such as chirped, stepped, and/or pulsed waveforms.

A frequency-modulated continuous wave (FMCW) LIDAR component is one particular type of phase coherent LIDAR component. An FMCW LIDAR component at least selectively (e.g., always when in use) controls its tunable laser so that it generates a waveform that is both: encoded through frequency modulation, and continuous. For example, the waveform can be a continuous stepped waveform that is encoded through frequency modulation. For instance, the tunable laser can be controlled to generate a stepped waveform that is encoded through modification of the frequency of the steps. Data from an FMCW LIDAR component of a vehicle is referred to herein as "FMCW LIDAR data". Accordingly, "phase coherent LIDAR data" can be "FMCW LIDAR data" when it is generated by an FMCW LIDAR component based on a waveform that is both encoded through frequency modulation and is continuous.

During a sensing cycle of a phase coherent LIDAR component, the transmitted encoded waveform is sequentially directed to, and sequentially reflects off of, each of a plurality of points in the environment. Reflected portions of the encoded waveform are each detected, in a corresponding sensing event of the sensing cycle, by the at least one receiver of the phase coherent LIDAR component. For example, the reflected portion of a sensing event can be detected by the at least one coherent optical receiver using a coherent-detection scheme in which the reflected portion is mixed with a local optical signal that corresponds to the transmitted encoded waveform. The coherent-detection scheme can be, for example, homodyne mixing, heterodyne mixing, self-heterodyne mixing, or other coherent-detection scheme. The resulting signal generated from mixing the reflected portion with the local optical signal indicates both: (1) range to the corresponding point, and (2) velocity of the corresponding point. For example, the resulting signal can be processed by applying a two-dimensional Fourier transform to the signal, to generate a 2D spectrum with a frequency coordinate in the direct dimension and a frequency coordinate in the indirect dimension. The frequency coordinate in the direct dimension can be utilized to determine the range and the frequency coordinate in the indirect dimension can be utilized to determine the velocity. As one particular example, a homodyne detection scheme can be used in which the local optical signal is a split portion of the transmitted encoded waveform and is used as an optical local oscillator signal for the optical receiver. Mixing the local oscillator with a time delayed reflected portion during the sensing event yields a time varying intermediate frequency (IF) waveform, which is directly related to the range of the corresponding point. Further, when the point is moving, a Doppler frequency shift will be superimposed to the IF waveform, which can be used to determine radial velocity of the point. Through detections at multiple sensing events of a sensing cycle, phase coherent LIDAR data is generated for each of a plurality of points in the environment of the vehicle—and indicates range, velocity, and optionally intensity, for each of the points in the environment for the sensing cycle.

As mentioned above, phase coherent LIDAR data generated by a phase coherent LIDAR component is utilized in determining classification(s), pose(s), and/or instantaneous velocity/velocities of object(s) in various implementations disclosed herein. In those implementations, the phase coherent LIDAR data of a sensing cycle indicates, directly or indirectly, a corresponding range and corresponding velocity for each of a plurality of points in an environment of a vehicle to which the phase coherent LIDAR component is coupled. In some of those implementations, the phase coherent LIDAR data includes a three-dimensional (3D) point cloud, with each point in the 3D point cloud defining a corresponding range (via its 3D coordinate in the 3D point cloud), corresponding velocity, and optionally a corresponding intensity. In some other implementations, the phase coherent LIDAR data includes a range-Doppler image, such as a range-Doppler image where each pixel defines a corresponding velocity (and optionally intensity) for a corresponding range and cross-range. In other words, each pixel in the range-Doppler image corresponds to a corresponding range and cross-range (which corresponds to a point in the environment), and defines a velocity for that range and cross-range. In yet other implementations, the phase coherent LIDAR data includes a time varying intermediate frequency (IF) waveform generated by optical receiver(s) of the FMCW LIDAR component based on mixing the local oscillator with the time delayed reflection. The time varying IF waveform can be utilized directly to determine classification(s), pose(s), and/or instantaneous velocity/velocities—and/or can be processed using a Fourier transform and/or other techniques, and the processed data utilized to determine the classification(s), pose(s), and/or instantaneous velocity/velocities. For example, each slice of the time varying IF waveform can be processed to determine range and velocity for a corresponding point in the environment, and the ranges and velocities for multiple points utilized in determining classification(s), pose(s), and/or instantaneous velocity/velocities. Accordingly, one or more of the preceding and/or other types of phase coherent LIDAR data can be generated by the phase coherent LIDAR component and utilized in determining feature(s) of an object according to implementations disclosed herein. The type(s) of phase coherent LIDAR data generated and utilized in determining feature(s) can be dependent on, for example, the particular phase coherent LIDAR component being utilized. Also, it is noted that in some implementations the velocities indicated in received phase coherent LIDAR data can have the ego vehicle's velocity subtracted out (e.g., based on a velocity of the ego vehicle determined based on sensor(s) of the ego vehicle, or based on inferring the velocity of the ego vehicle based on velocities of static objects in the phase coherent LIDAR data). In some other implementations, the ego vehicle's velocity may not be subtracted out of the received phase coherent LIDAR data. In those implementations, the received phase coherent LIDAR data may optionally be processed to subtract out the ego vehicle's velocity.

In some implementations, the phase coherent LIDAR data is from a phase coherent LIDAR monopulse component that includes at least a first and second receiver, such as a first and second coherent optical receiver. In those implementations, each sensing event includes a first receiver sensing event by the first receiver and a second receiver sensing event by the second receiver. For example, the first receiver sensing event can include coherent mixing of a local oscillator with a first detection of a reflected portion of the waveform and the second receiver sensing event can include coherent mixing of the local oscillator with a second detection of a reflected portion of the waveform. The first receiver sensing event and the second receiver sensing event are denoted herein as separate events as they are by separate receivers. However, it is noted that the sensing events can each be of the same reflection and can occur concurrently, or substantially concurrently (e.g., within one millisecond of one another, within one microsecond of one another, or within one nanosecond of one another).

The first and second receivers are positionally offset relative to one another, thereby causing the first and second detections to vary (e.g., temporally and/or characteristically (e.g., in phase)). This enables at least one extra channel of data to be determined for a sensing event based on comparison of the first receiver sensing event and the second receiver sensing event. The extra channel can be utilized to increase the angular accuracy for point(s) determined based on the sensing event. For example, the extra channel can be based on amplitude and/or phase differences between the first and second receiver sensing events (e.g., differences in the time varying IF waveform generated by each of the first and second receivers in mixing with the local oscillator signal). For instance, the amplitude and/or phase differences can be compared to determine an angle (a particular angle or range of angles), for each of one or more point(s) determined based on the sensing event, where each angle is resolved so that the point(s) are smaller than the beam width of the reflection that resulted in the sensing event. Accordingly, the angle (e.g., azimuth and elevation relative to the receiver(s)) for a corresponding range can be determined to a sub-beam width level, thereby providing greater accuracy of the determined angle. Moreover, the point can be localized to a sub-beam width level as the position of the point is defined by the angle and the range.

It is noted that, in some implementations, multiple range/velocity pairs can be determined based on a single sensing event (e.g., based on differences in range and/or velocity among the multiple range/velocity pairs indicated by a range-Doppler image and/or IF waveform). In those implementations, a corresponding angle can be determined for each of the multiple range/velocity pairs, and can each be resolved to a sub-beam width level. In other words, a single sensing event of a sensing cycle can be utilized to determine a corresponding range and corresponding velocity for each of two or more points. In some versions of those implementations, beam width(s) of the electromagnetic output that is output by the laser of a phase coherent LIDAR component can be purposefully fattened/widened to enable covering of more space by the beam width, as compared to non-fattened beam widths. For example, a beam width can be fixed so that, at a given distance from the phrase coherent LIDAR component (e.g., 10 meters, 15 meters, 20 meters, 50 meters, or other distance), there are no coverage gaps between the beams of a sensing cycle. Increased angular accuracy techniques described herein can be utilized to determine a corresponding range and corresponding velocity for each of two or more points that are within the fattened beam width of each beam of the sensing cycle. This enables determination of ranges and velocities with a degree of accuracy that, absent increased angular velocity techniques described herein, would otherwise require a greater quantity of beams and sensing events in a sensing cycle. Accordingly, increased angular velocity techniques described herein enable resolution of ranges and velocities with a given degree of accuracy in a sensing cycle, while reducing the quantity of sensing events in the sensing cycle needed to achieve the degree of accuracy. This can decrease the quantity of sensing events that occur in each sensing cycle, thereby conserving hardware resources (e.g., laser resources and/or power source resources). This can additionally or alternatively enable resolution of a given quantity of ranges and velocities for an area in a reduced amount of time, thereby providing excess time for resolving ranges and velocities for additional area(s) (e.g., enabling a larger total area to be covered in each sensing cycle without increasing the duration of the sensing cycle) and/or enabling quick re-resolving of updated ranges and velocities for the area (e.g., enabling sensing cycles to be shortened, without reduction of angular accuracy).

Accordingly, with a phase coherent LIDAR monopulse component, super-pixel accuracy can be achieved while reducing the signal-to-noise ratio (SNR) (i.e., increasing the noise) through splitting of the reflection across two or more receivers. This can be beneficial in determining ranges and velocities for point(s) of various objects that are far away (from the phase coherent LIDAR monopulse component) and/or small. For example, it can increase the angular accuracy (more accurate positioning, in an angular sense, for a given point) for which range and velocity can be determined for a given return/sensing event—thereby increasing the angular accuracy and enabling determination (or at least more accurate determination) of classification(s), a pose, and/or movement parameter(s) for an object that is far away and/or small, whereas classification(s), pose, and/or movement parameter(s) would otherwise not be determinable (or would at least be less accurate) for the object that is far away and/or small.

In various implementations, with a phase coherent LIDAR monopulse component, super-resolution can additionally and/or alternatively be achieved while reducing the signal-to-noise ratio (SNR) (i.e., increasing the noise) through splitting of the reflection across two or more receivers. The two or more receivers are positionally offset relative to one another, thereby causing respective detections of the receivers to vary (e.g., temporally and/or characteristically (e.g., in phase)). This enables non-redundant LIDAR data from the sensing event at each receiver to be combined to generate LIDAR data (e.g., a range-Doppler image and/or IF waveform) that is of higher resolution (e.g., higher resolution range and/or velocity) than the LIDAR data from any one of the sensing events at a respective receiver. In other words, each sensing event can include a receiver sensing event at each receiver (e.g., a first receiver sensing event at a first receiver, a second receiver sensing event at a second receiver, etc.) and produce respective LIDAR data for the respective receiver sensing event. The non-redundant LIDAR data for the receiver sensing events can be combined to construct super-resolution LIDAR data for the sensing event. The non-redundant LIDAR data can be based on, for example, amplitude and/or phase differences between the respective receiver sensing events (e.g., differences in the time varying IF waveform generated by each of the first and second receivers in mixing with the local oscillator signal). Various techniques can be utilized to generate super-resolution LIDAR data from multiple receiver sensing events, such as frequency domain techniques (e.g., based on shift and aliasing properties of the Continuous and Discrete Fourier Transforms) and/or spatial domain techniques (e.g., non-iterative and/or iterative techniques). Spatial domain techniques can be utilized to apply one or more flexible estimators in constructing super-resolution LIDAR data from lower resolution LIDAR data from receiver sensing events. Such flexible estimators include, for example, Maximum likelihood, Maximum a Posteriori, Projection Onto Convex Sets, Bayesian treatments, etc. Additional description of some phase coherent LIDAR techniques and some phase coherent LIDAR components are provided herein, including monopulse components and techniques.

As mentioned above, during a sensing cycle of a phase coherent LIDAR component, a transmitted encoded waveform is sequentially directed to, and sequentially reflects off of, each of a plurality of points in the environment—and reflected portions of the encoded waveform are each detected, in a corresponding sensing event of the sensing cycle, by the at least one receiver of the phase coherent LIDAR component. During a sensing cycle, the waveform is directed to a plurality of points in an area of an environment, and corresponding reflections detected, without the waveform being redirected to those points in the sensing cycle. Accordingly, the range and velocity for a point that is indicated by phase coherent LIDAR data of a sensing cycle can be instantaneous in that is based on single sensing event without reference to a prior or subsequent sensing event. In some implementations, each of multiple (e.g., all) sensing cycles can have the same duration, the same field-of-view, and/or the same pattern of waveform distribution (through directing of the waveform during the sensing cycle). For example, each of multiple sensing cycles that are each a sweep can have the same duration, the same field-of-view, and the same pattern of waveform distribution. However, in many other implementations the duration, field-of-view, and/or waveform distribution pattern can vary amongst one or more sensing cycles. For example, a first sensing cycle can be of a first duration, have a first field-of view, and a first waveform distribution pattern; and a second sensing cycle can be of a second duration that is shorter than the first, have a second field-of-view that is a subset of the first field-of-view, and have a second waveform distribution pattern that is denser than the first.

Turning now to the Figures, FIG. 1 illustrates an example autonomous vehicle 100 within which the various techniques disclosed herein may be implemented. Vehicle 100, for example, may include a powertrain 102 including a prime mover 104 powered by an energy source 106 and capable of providing power to a drivetrain 108, as well as a control system 110 including a direction control 112, a powertrain control 114, and brake control 116. Vehicle 100 may be implemented as any number of different types of vehicles, including vehicles capable of transporting people and/or cargo, and capable of traveling by land, by sea, by air, underground, undersea and/or in space, and it will be appreciated that the aforementioned components 102-116 can vary widely based upon the type of vehicle within which these components are utilized.

The implementations discussed hereinafter, for example, will focus on a wheeled land vehicle such as a car, van, truck, bus, etc. In such implementations, the prime mover 104 may include one or more electric motors and/or an internal combustion engine (among others). The energy source 106 may include, for example, a fuel system (e.g., providing gasoline, diesel, hydrogen, etc.), a battery system, solar panels or other renewable energy source, and/or a fuel cell system. Drivetrain 108 may include wheels and/or tires along with a transmission and/or any other mechanical drive components suitable for converting the output of prime mover 104 into vehicular motion, as well as one or more brakes configured to controllably stop or slow the vehicle 100 and direction or steering components suitable for controlling the trajectory of the vehicle 100 (e.g., a rack and pinion steering linkage enabling one or more wheels of vehicle 100 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles), and in some instances multiple electric motors (e.g., dedicated to individual wheels or axles) may be used as a prime mover.

Direction control 112 may include one or more actuators and/or sensors for controlling and receiving feedback from the direction or steering components to enable the vehicle 100 to follow a desired trajectory. Powertrain control 114 may be configured to control the output of powertrain 102, e.g., to control the output power of prime mover 104, to control a gear of a transmission in drivetrain 108, etc., thereby controlling a speed and/or direction of the vehicle 100. Brake control 116 may be configured to control one or more brakes that slow or stop vehicle 100, e.g., disk or drum brakes coupled to the wheels of the vehicle.

Other vehicle types, including but not limited to airplanes, space vehicles, helicopters, drones, military vehicles, all-terrain or tracked vehicles, ships, submarines, construction equipment, etc., will necessarily utilize different powertrains, drivetrains, energy sources, direction controls, powertrain controls and brake controls, as will be appreciated by those of ordinary skill having the benefit of the instant disclosure. Moreover, in some implementations some of the components may be combined, e.g., where directional control of a vehicle is primarily handled by varying an output of one or more prime movers. Therefore, implementations disclosed herein not limited to the particular application of the herein-described techniques in an autonomous wheeled land vehicle.

In the illustrated implementation, full or semi-autonomous control over vehicle 100 is implemented in a vehicle control system 120, which may include one or more processors 122 and one or more memories 124, with each processor 122 configured to execute program code instructions 126 stored in a memory 124. The processor(s) 122 can include, for example, graphics processing unit(s) (GPU(s)) and/or central processing unit(s) (CPU(s)).

Sensors 130 may include various sensors suitable for collecting information from a vehicle's surrounding environment for use in controlling the operation of the vehicle. For example, sensors 130 can include a frequency-modulated continuous wave (FMCW) Light Detection and Ranging (LIDAR) component 132 of the vehicle (FMCW). As described herein, the FMCW LIDAR component 132 can generate FMCW LIDAR data that can be utilized in determining a pose, classification, and velocity for each of one or more objects in an environment of the vehicle 100. The FMCW LIDAR data generated by FMCW LIDAR component 132 indicates, for each of a plurality of points in the environment of the vehicle, a corresponding range and a corresponding velocity based on a corresponding sensing event of the FMCW LIDAR component. Although an FMCW LIDAR component is illustrated in FIG. 1 (and other Figures) and described herein in association with many figures, in many implementations a phase coherent LIDAR component that is not an FMCW LIDAR component can instead be utilized. Further, in those implementations phase coherent LIDAR data, that is not FMCW LIDAR data, can be utilized in lieu of FMCW LIDAR data.

Sensors 130 can also optionally include a Radio Detection and Ranging (RADAR) component 134 and/or a LIDAR component 136 (non-phase coherent, that generates data that can be utilized to determine ranges, but not velocities). Further, sensors can also optionally include a satellite navigation (SATNAV) component 138, e.g., compatible with any of various satellite navigation systems such as GPS, GLONASS, Galileo, Compass, etc. The SATNAV component 138 can be used to determine the location of the vehicle on the Earth using satellite signals. Sensors 130 can also optionally include a camera 140, an inertial measurement unit (IMU) 142 and/or one or more wheel encoders 144. The camera 140 can be a monographic or stereographic camera and can record still and/or video imagers. The IMU 142 can include multiple gyroscopes and accelerometers capable of detecting linear and rotational motion of the vehicle 100 in three directions. Wheel encoders 142 may be used to monitor the rotation of one or more wheels of vehicle 100.

The outputs of sensors 130 may be provided to a set of control subsystems 150, including, a localization subsystem 152, a planning subsystem 156, a perception subsystem 154, and a control subsystem 158. Localization subsystem 152 is principally responsible for precisely determining the location and orientation (also sometimes referred to as "pose") of vehicle 100 within its surrounding environment, and generally within some frame of reference. Perception subsystem 154 is principally responsible for detecting, tracking and/or identifying elements within the environment surrounding vehicle 100. For example, and as described herein, perception subsystem 154 can, at each of a plurality of iterations, determine a pose, classification, and velocity for each of one or more objects in the environment surrounding vehicle 100. Further, for example, the perception subsystem 154 can track various objects over multiple iterations. For instance, the perception subsystem 154 can track an additional vehicle over multiple iterations as the additional vehicle moves relative to the ego vehicle 100. The perception subsystem 154 utilize detection, classification, and/or velocity techniques described herein in tracking of an object over multiple iterations. Planning subsystem 156 is principally responsible for planning a trajectory for vehicle 100 over some timeframe given a desired destination as well as the static and moving objects within the environment. For example, and as described herein, planning subsystem 156 can plan a trajectory for vehicle 100 based at least in part on a pose, classification, and/or velocity for each of one or more objects in an environment of the vehicle 100 in the environment surrounding vehicle 100. In some implementations, planning subsystem 156 plans the trajectory for the vehicle 100 by generating, and considering, candidate trajectories for each of one or more additional mobile objects in the environment. Planning subsystem 156 can determine a candidate trajectory for an object at an iteration based on a pose, classification, and/or velocity for the iteration—and/or the tracking of the object over multiple iterations. Control subsystem 158 is principally responsible for generating suitable control signals for controlling the various controls in control system 110 in order to implement the planned trajectory of the vehicle 100.

It will be appreciated that the collection of components illustrated in FIG. 1 for vehicle control system 120 is merely exemplary in nature. Individual sensors may be omitted in some implementations. Additionally or alternatively, in some implementations multiple sensors of the types illustrated in FIG. 1 may be used for redundancy and/or to cover different regions around a vehicle, and other types of sensors may be used. Likewise, different types and/or combinations of control subsystems may be used in other implementations. Further, while subsystems 152-160 are illustrated as being separate from processors 122 and memory 124, it will be appreciated that in some implementations, some or all of the functionality of a subsystem 152-160 may be implemented with program code instructions 126 resident in one or more memories 124 and executed by one or more processors 122, and that these subsystems 152-160 may in some instances be implemented using the same processors and/or memory. Subsystems in some implementations may be implemented at least in part using various dedicated circuit logic, various processors, various field-programmable gate arrays ("FPGA"), various application-specific integrated circuits ("ASIC"), various real time controllers, and the like, and as noted above, multiple subsystems may utilize circuitry, processors, sensors and/or other components. Further, the various components in vehicle control system 120 may be networked in various manners.

In some implementations, vehicle 100 may also include a secondary vehicle control system (not illustrated), which may be used as a redundant or backup control system for vehicle 100. In some implementations, the secondary vehicle control system may be capable of fully operating autonomous vehicle 100 in the event of an adverse event in vehicle control system 120, while in other implementations, the secondary vehicle control system may only have limited functionality, e.g., to perform a controlled stop of vehicle 100 in response to an adverse event detected in primary vehicle control system 120. In still other implementations, the secondary vehicle control system may be omitted.

In general, an innumerable number of different architectures, including various combinations of software, hardware, circuit logic, sensors, networks, etc. may be used to implement the various components illustrated in FIG. 1. Each processor may be implemented, for example, as a microprocessor and each memory may represent the random access memory (RAM) devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in vehicle 100, e.g., any cache memory in a processor, as well as any storage capacity used as a virtual memory, e.g., as stored on a mass storage device or on another computer or controller. One or more processors illustrated in FIG. 1, or entirely separate processors, may be used to implement additional functionality in vehicle 100 outside of the purposes of autonomous control, e.g., to control entertainment systems, to operate doors, lights, convenience features, etc.

In addition, for additional storage, vehicle 100 may also include one or more mass storage devices, e.g., a removable disk drive, a hard disk drive, a direct access storage device (DASD), an optical drive (e.g., a CD drive, a DVD drive, etc.), a solid state storage drive (SSD), network attached storage, a storage area network, and/or a tape drive, among others. Furthermore, vehicle 100 may include a user interface 164 to enable vehicle 100 to receive a number of inputs from and generate outputs for a user or operator, e.g., one or more displays, touchscreens, voice and/or gesture interfaces, buttons and other tactile controls, etc. Otherwise, user input may be received via another computer or electronic device, e.g., via an app on a mobile device or via a web interface.

Moreover, vehicle 100 may include one or more network interfaces, e.g., network interface 162, suitable for communicating with one or more networks (e.g., a LAN, a WAN, a wireless network, and/or the Internet, among others) to permit the communication of information with other computers and electronic devices, including, for example, a central service, such as a cloud service, from which vehicle 100 receives environmental and other data for use in autonomous control thereof.

Each processor illustrated in FIG. 1, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 100 via network, e.g., in a distributed, cloud-based, or client-server computing environment, whereby the processing required to implement the functions of a computer program may be allocated to multiple computers and/or services over a network.

In general, the routines executed to implement the various implementations described herein, whether implemented as part of an operating system or a specific application, component, program, object, module or sequence of instructions, or even a subset thereof, will be referred to herein as "program code." Program code typically comprises one or more instructions that are resident at various times in various memory and storage devices, and that, when read and executed by one or more processors, perform the steps necessary to execute steps or elements embodying the various aspects of the invention. Moreover, while implementations have and hereinafter will be described in the context of fully functioning computers and systems, it will be appreciated that the various implementations described herein are capable of being distributed as a program product in a variety of forms, and that implementations can be implemented regardless of the particular type of computer readable media used to actually carry out the distribution. Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.), among others.

In addition, various program code described hereinafter may be identified based upon the application within which it is implemented in a specific implementation. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art, having the benefit of the present disclosure, will recognize that the exemplary environment illustrated in FIG. 1 is not intended to limit implementations disclosed herein. Indeed, those skilled in the art will recognize that other alternative hardware and/or software environments may be used without departing from the scope of implementations disclosed herein.

Figure 2A:
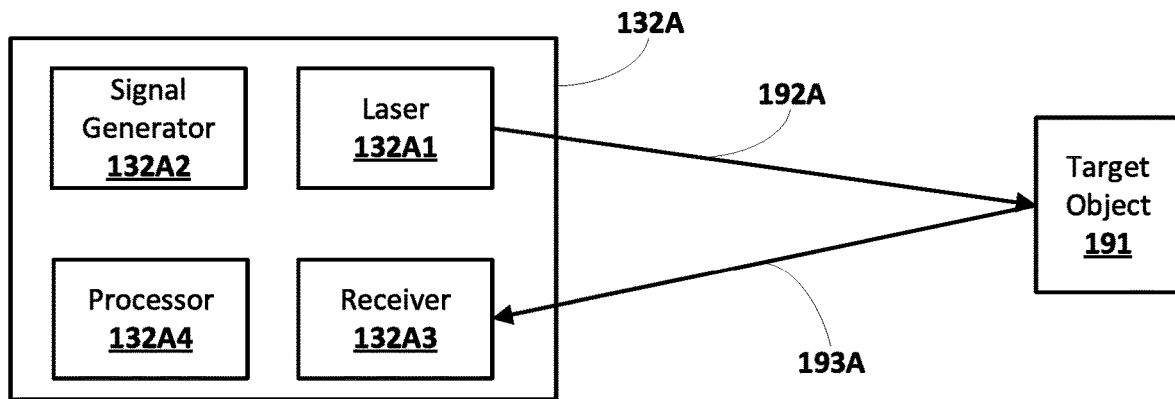
FIG. 2A schematically illustrates an implementation of an FMCW LIDAR component of FIG. 1.
Figure 2B:
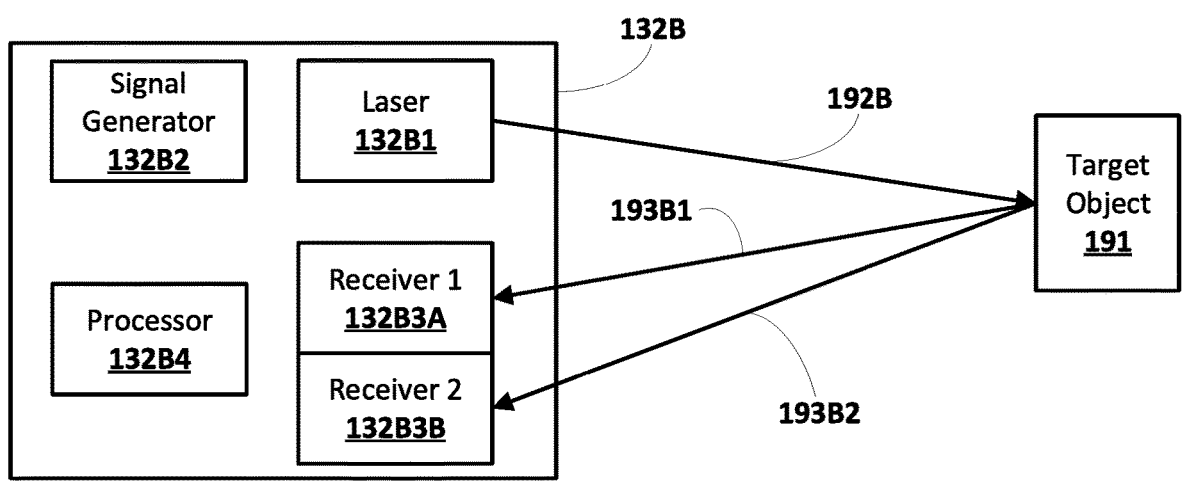
FIG. 2B schematically illustrates another implementation of an FMCW LIDAR component of FIG. 1.

Turning now to FIGS. 2A and 2B, two implementations of FMCW LIDAR component 132 of FIG. 1 are schematically illustrated. FIG. 2A illustrates an FMCW LIDAR component 132A that includes a single receiver 132A3, whereas FIG. 2B illustrates an FMCW LIDAR monopulse component 132B that includes two receivers 132B3A and 132B3B.

In FIG. 2A, FMCW LIDAR component 132A includes a tunable laser 132A1 whose optical output is controlled by signal generator 132A2. Signal generator 132A2 drives the laser 132A1 such that the laser 132A1 generates electromagnetic output that is in the optical spectra, and that is encoded through modification of the frequency of the electromagnetic output. The signal generator 132A2 generates a signal to cause the waveform to be encoded. Various types of frequency encoded waveforms can be generated via the signal generator 132A2 and the laser 132A1.

FIG. 2A illustrates a transmitted beam 192A from the laser 132A1 that is encoded as described in the preceding paragraph, and that is directed toward a point on a target object 191. The transmitted beam 192A is reflected off the point on the target object 191 and the reflection 193A is received at the receiver 132A3 during a sensing event. The transmitted beam 192A includes a slice of the encoded waveform and the reflection 193A also includes the slice of the encoded waveform. The slice of the encoded waveform is detected by the receiver 132A3 during the sensing event.

The receiver 132A3 can be a coherent receiver and the reflection 193A can be detected by the receiver 132A3 using a coherent-detection scheme in which the reflection 193A is mixed with a local optical signal, such as a local optical signal that is a split portion of the transmitted beam 192A. It is noted that the detection of the reflection 193A by the receiver 132A3 will be time delayed with respect to detection of the local optical signal (e.g., the split portion of the transmitted beam 192A). The coherent-detection scheme can be implemented by the processor 132A4 and can be, for example, homodyne mixing, heterodyne mixing, self-heterodyne mixing, or other coherent-detection scheme. The resulting signal generated from mixing the reflected portion with the local optical signal indicates both: (1) range to the point of the target object 191, and (2) velocity of the point of the target object 191. In some implementations, the processor 132A4 provides the resulting signal as FMCW LIDAR data for the point from the FMCW LIDAR component 132A. In some other implementations, the processor 132A4 performs further processing to generate FMCW LIDAR data for the point that directly indicates the range and the velocity of the point. For example, the range and the velocity of the point can be directly indicated in FMCW LIDAR data that is a 3D point cloud that indicates range and velocity values, or a range-Doppler image. Through detections over multiple sensing events, where a direction of the optical output from the laser 132A1 is varied (e.g., in Azimuth and/or Elevation), FMCW LIDAR data is generated by the FMCW LIDAR component for each of a plurality of points in the environment—and indicates range, velocity, and optionally intensity, for each of the points in the environment.

Although the description of FIG. 2A above describes an FMCW LIDAR component, it is noted that a phase coherent LIDAR component that is not FMCW can have the same and/or similar components. However, with the non-FMCW LIDAR component, the signal generator 132A2 can drive the laser 132A1 to generate a waveform that is non-continuous and/or that is encoded using a technique other than frequency modulation.

In FIG. 2B, FMCW LIDAR monopulse component 132B includes a tunable laser 132B1 whose optical output is controlled by signal generator 132B2. Signal generator 132B2 drives the laser 132B1 such that the laser 132B1 generates electromagnetic output that is in the optical spectra, and that is encoded through modification of the frequency of the electromagnetic output. The signal generator 132B2 generates a signal to cause the waveform to be encoded. Various types of encoded waveforms can be generated via the signal generator 132B2 and the laser 132B1.

FIG. 2B illustrates a transmitted beam 192B from the laser 132B1 that is encoded as described in the preceding paragraph, and that is directed toward a point on a target object 191. The transmitted beam 192B is reflected off the point on the target object 191 and, during a sensing event, a first reflection 193B1 is received at the first receiver 132B3A and a second reflection 193B2 is received at the second receiver 132B3B. The transmitted beam 192B includes a slice of the encoded waveform and the reflections 193B1 and 193B2 also include the slice of the encoded waveform. The first and second receivers 132B3A and 132B3B can be coherent receivers and the sensing event can include a first receiver sensing event and a second receiver sensing event. The first receiver sensing event can include coherent mixing of a local oscillator (e.g., a split portion of the transmitted beam 192B) with a first detection of the first reflection 193B1 and the second receiver sensing event can include coherent mixing of the local oscillator with a second detection of the second reflection 193B2. The first and second receiver 132B3A and 132B3B are positionally offset relative to one another, thereby causing the first and second detections to vary. This enables the processor 132B4 to determine at least one extra channel of data for the sensing event based on comparison of the first receiver sensing event and the second receiver sensing event. For example, the processor 132B4 can determine the extra channel based on amplitude and/or phase differences between the first and second receiver sensing events (e.g., differences in the time varying IF generated by each of the first and second receivers in mixing with the local oscillator signal). For instance, the amplitude and/or phase differences can be compared to determine an angle (a particular angle or range of angles), for each of one or more point(s) determined based on the sensing event, where each angle is resolved so that the point(s) are smaller than the beam width of the reflection that resulted in the sensing event. Accordingly, the angle (e.g., azimuth and elevation relative to the receiver(s)) for a corresponding range can be determined to a sub-beam width level. Moreover, the point can be localized to a sub-beam width level as the position of the point is defined by the angle and the range. Accordingly, increased angular accuracy can be achieved while reducing the signal-to-noise ratio (SNR) (i.e., increasing the noise) through splitting of the reflection across two receivers. This can be beneficial in determining ranges and velocities for multiple points of an additional vehicle that is far away (from the FMCW LIDAR monopulse component) and/or small. Additionally or alternatively, and as described herein, the processor 132B4 can determine LIDAR data with super-resolution using non-redundant data from the first and second detections. For example, the processors 132B4 can construct super-resolution LIDAR data from lower-resolution LIDAR data from the first and second detections. Accordingly, super-resolution range and velocity can be determined, while reducing the SNR through the splitting of the reflection across two receivers.

In some implementations, the processor 132B4 provides the signal, generated from the first and second receiver sensing events, as FMCW LIDAR monopulse data for the points from the FMCW LIDAR monopulse component 132B. In some other implementations, the processor 132B4 performs further processing to generate FMCW LIDAR monopulse data for the points that directly indicates the range and the velocity of the points. For example, the range and the velocity of the points can be directly indicated in FMCW LIDAR monopulse data that is a 3D point cloud or a range-Doppler image. Through detections over multiple sensing events where a direction of the optical output from the laser 132B1 is varied (e.g., in Azimuth and/or Elevation), FMCW LIDAR monopulse data is generated by the FMCW LIDAR monopulse component 132B for each of a plurality of points in the environment—and indicates range, velocity, and optionally intensity, for each of the points in the environment.

Although the description of FIG. 2B above describes an FMCW LIDAR monopulse component, it is noted that a phase coherent LIDAR monopulse component that is not FMCW can have the same and/or similar components. However, with the non-FMCW LIDAR component, the signal generator 132B2 can drive the laser 132B1 to generate a waveform that is non-continuous and/or that is encoded using a technique other than frequency modulation.

Figure 3A:
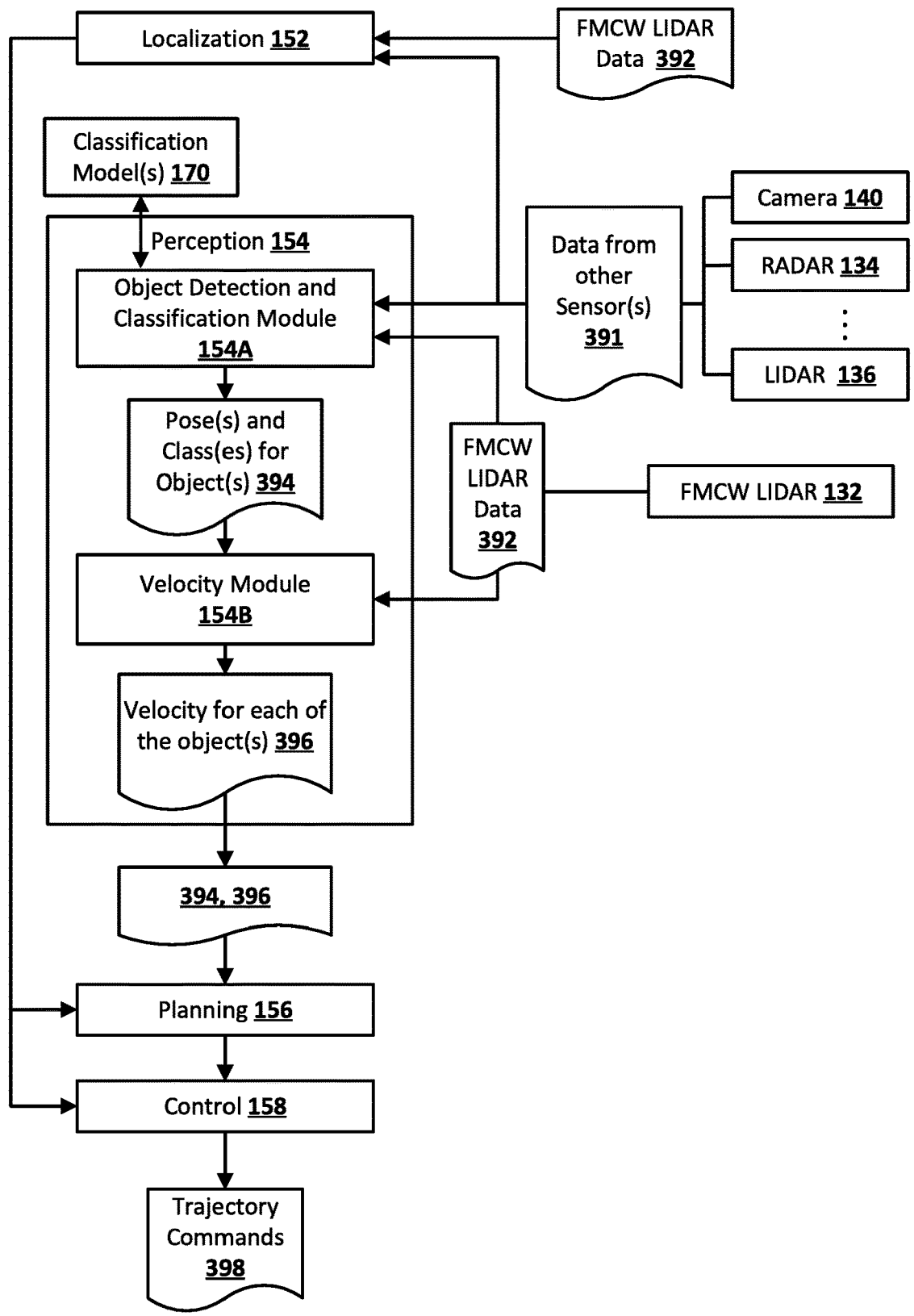
FIG. 3A is a block diagram illustrating implementations of determining classification(s) for object(s) in an environment of a vehicle, and controlling the vehicle based on the classification(s).

Turning now to FIG. 3A, a block diagram is provided that illustrates implementations of determining classification(s) for object(s) in an environment of a vehicle, and controlling the vehicle based on the classification(s). FIG. 3A illustrates subsystems 152, 154, 156, and 158 of vehicle control system 120, and examples of how they may interact in determining classification(s) for object(s) in an environment of the vehicle, determining pose(s) for the object(s), determining movement parameter(s) (if any) for the object(s), and/or adapting autonomous control based on the determinations.

Localization subsystem 152 is generally responsible for localizing a vehicle within its environment. Localization subsystem 152, for example, may determine a pose (generally a position, and in some instances orientation) of the autonomous vehicle 100 within its surrounding environment. The localization subsystem 152 can determine the pose of the autonomous vehicle 100 utilizing FMCW LIDAR data 392 from FMCW LIDAR component 132 and/or data from other sensor(s) 391, such as camera 140, RADAR component 134, LIDAR component 136, and/or other sensors 130 of FIG. 1 (e.g., IMU 142, encoders 144). The pose determined by the localization subsystem 152 can be, for example, relative to a map utilized by the vehicle control system 120. The pose can be updated by the localization subsystem 152 as the vehicle 100 moves throughout its environment, and the pose provided to (or otherwise made accessible to) one or more of the other subsystems 154, 156, and/or 158 for use by the subsystem(s).

Perception subsystem 154 is principally responsible for perceiving objects within the environment of the vehicle, and can utilize FMCW LIDAR data 392 and optionally data from other sensor(s) 391 (e.g., camera 140, RADAR component 134) to detect those objects, classify those objects, determine velocities for those objects, and track those objects.

Perception subsystem 154 can include an object detection and classification module 154A that utilizes FMCW LIDAR data 392 and/or data from other sensor(s) 391 in detecting various objects (e.g., determining the pose of the objects) and classifying the detected objects. For example, the object detection and classification module 154A can process FMCW LIDAR data 392 and/or data from other sensor(s) 391 in detecting and classifying additional vehicles, pedestrians, animals, trees, signs, bicyclists, and/or other object(s) in the environment of the vehicle 100.

In various implementations, the object detection and classification module 154A can utilize one or more classification models 170 in detecting and/or classifying various objects. For example, the classification model(s) can include one or more trained machine learning model(s) such as Bayesian models, random forest models, Markov models, and/or neural network models. For instance, the trained machine learning model(s) can include a neural network model that is trained for utilization in processing FMCW LIDAR data (and/or other data) to generate output that indicates, for each of one or more objects captured by the data, a corresponding pose of the object and corresponding classification(s) of the object. Some non-limiting examples of such neural network models are described in more detail herein (e.g., with reference to FIGS. 3B, 3C, 4A, and 4B). In some implementations, in detecting and/or classifying various objects, the object detection and classification module 154A can additionally or alternatively process FMCW LIDAR data 392 and/or data from other sensor(s) 391 without utilization of machine learning model(s). For example, nearest neighbor and/or other clustering techniques can be utilized to determine portions of data that likely have a corresponding classification.

Regardless of the technique(s) utilized, object detection and classification module 154A can provide an indication of pose(s) and class(es) for object(s) 394 to a velocity module 154B of the perception subsystem 154. The provided pose for each object can be, for example, relative to a map utilized by the vehicle control system 120 and/or relative to the FMCW LIDAR data 392. The velocity module 154B uses the FMCW LIDAR data 392 to determine an instantaneous velocity for each of one or more of the objects 396. In some implementations, the velocity module 154B determines an instantaneous velocity for only those object(s) having certain classification(s) (as indicated by 394) and/or excludes certain classification(s) of objects from instantaneous velocity determination. For example, the velocity module 154B can exclude object(s) having certain classification(s) indicative of non-moving objects, such as a tree classification. Also, for example, the velocity module 154B can exclude object(s) having certain classification(s) indicative of certain relatively slow moving objects, such as a pedestrian classification. As yet another example, the velocity module 154B can determine an instantaneous velocity for object(s) having vehicle, bicyclist, and/or other classification(s) indicative of objects that can be moving relatively fast.

In determining an instantaneous velocity for an object, the velocity module 154B can use the provided pose for that object (provided in 394) to determine a subgroup of FMCW LIDAR data 392 that corresponds to the pose (and resultantly, the object). Further, the velocity module 154B can determine the instantaneous velocity as a function of the velocities (including directions and magnitudes) of the FMCW LIDAR data of the subgroup. For example, the velocity module 154B can determine the instantaneous velocity based on a mean, median, and/or other statistical measure of the velocities. As another example, the velocity module 154B can additionally or alternatively distribute velocities of the FMCW LIDAR data of the subgroup into bins (where each bin corresponds to a range of velocities), and determine the instantaneous velocity based on the bin(s) with the largest quantity of occurrences of velocities that conform to the bin(s) (e.g., a histogram analysis). Additional and/or alternative techniques can be utilized.

In some implementations, the velocity module 154B can select a particular instantaneous velocity determination technique for an object, from a plurality of candidate techniques, based on the classification for the object. For example, for an object classification of pedestrian, the instantaneous velocity can be determined based on a mean of the FMCW LIDAR data of the subgroup that corresponds to the pedestrian, whereas an average can instead be utilized for an object classification of a vehicle. As another example, for an object classification of vehicle, the instantaneous velocity can be determined using a histogram analysis, whereas a histogram analysis is not used for an object classification of a pedestrian. In some implementations, the velocity module 154B can additionally or alternatively select a particular instantaneous velocity determination technique for an object, from a plurality of candidate techniques, based on the pose of the object and/or the quantity of FMCW LIDAR data of the subgroup that corresponds to the object. For example, when the pose for an object indicates the object is relatively far away from the vehicle, the velocity module 154B can utilize a technique that is more computationally efficient (but potentially less robust and/or less accurate) than an alternative technique that is instead utilized when the pose indicates the object is relatively close. As another example, when the quantity of FMCW LIDAR data of the subgroup that corresponds to the object is relatively small (e.g., due to the object being far away), the velocity module 154B can utilize a first technique (e.g., average), whereas when the quantity of FMCW LIDAR data of the subgroup is relatively large, the velocity module 154B can utilize a second technique (e.g., histogram analysis).

The perception subsystem 154 provides the instantaneous velocity for each of one or more of the objects 396, and the pose(s) and class(es) for the object(s) 394 to the planning subsystem 156 (or otherwise makes it available to the planning subsystem 156). The planning subsystem 156 is principally responsible for planning out a trajectory of the vehicle over some time frame (e.g., several seconds), and may receive input from both localization subsystem 152 and perception subsystem 154. The planning subsystem 156 can adapt the trajectory of the vehicle based on the provided velocities, poses, and/or classes for the objects. For example, if the data 396 and 394 indicate, for a given object that is an additional vehicle: a classification of vehicle, a pose for the additional vehicle, and an instantaneous velocity for the additional vehicle—the planning subsystem 154 can utilize the pose and the instantaneous velocity for the vehicle in determining one or more candidate trajectories for the additional vehicle. The planning subsystem 154 can utilize the instantaneous velocity alone in determining the one or more candidate trajectories for the additional vehicle, or can also utilize one or more previously determined velocities for the additional vehicle. For example, the planning subsystem 154 can utilize the instantaneous velocity, as well as one or more immediately preceding determined instantaneous velocities for the additional vehicle (each determined based on FMCW LIDAR data from a prior sensing cycle). Further, the planning subsystem 154 can adapt the intended trajectory of the ego vehicle 100 so that the ego vehicle 100 does not contact and/or come within a threshold distance of the additional vehicle if the additional vehicle traverses one of the candidate trajectories.

As another example, if the data 396 and 394 further indicate, for a given object that is a pedestrian, a classification of pedestrian, and a pose for the pedestrian (but no velocity for the pedestrian), the planning subsystem 154 can utilize the pose and the classification of pedestrian to determine a candidate trajectory area around the pedestrian, where the candidate trajectory area is an area around the pose for the pedestrian that is determined based on a maximum distance a pedestrian could travel before the next object detection event, and/or determined based on a default maximum velocity for an object having a pedestrian classification. Further, the planning subsystem can determine a trajectory of the ego vehicle that avoids the candidate trajectory area around the pose for the pedestrian. As yet another example, if the data 396 and 394 further indicate, for a given object that is a tree, a classification of tree, and a pose for the tree (but no velocity for the tree), the planning subsystem 154 can utilize the pose and the classification of tree to determine a trajectory of the ego vehicle that avoids the pose of the tree. Additional description of these and other techniques for controlling a vehicle based on determined classifications, poses, and velocities of objects are provided herein. For example, additional description of some techniques is provided below in association with description of FIGS. 7A and 7B.

The trajectory and/or other data generated by the planning subsystem 156 is then passed on to control subsystem 158 to convert the desired trajectory into trajectory commands 398 suitable for controlling the various vehicle controls 112, 114, and/or 116 in control system 110, with localization data also provided to control subsystem 158 to enable the control subsystem 158 to issue appropriate commands to implement the desired trajectory as the location of the vehicle changes over the time frame.

Figure 3B:
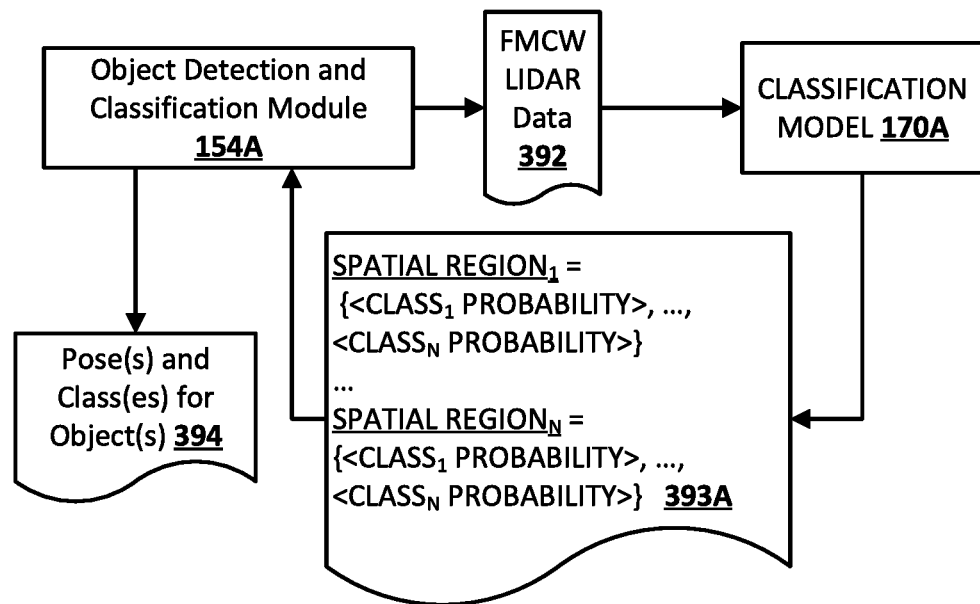
FIG. 3B is a block diagram illustrating one example how classification(s) for object(s) in an environment of a vehicle can be determined in FIG. 3A.

FIG. 3B is a block diagram illustrating one example of how pose(s) and class(es) for object(s) 394 of FIG. 3A can be determined utilizing a classification model 170A. Classification model 170A is one example of classification model(s) 170 of FIG. 3A. In FIG. 3B, the object detection and classification module 154A applies FMCW LIDAR data 392 as input to classification model 170A, processes the FMCW LIDAR data 392 using the classification model 170A, and generates output 393A based on the processing. In some implementations, the FMCW LIDAR data 392 is applied in the same form as it is received from the FMCW LIDAR component 136. In some other implementations, pre-processing of the FMCW LIDAR data 392 is performed prior to applying it as input to the classification model 170A. For example, the FMCW LIDAR data 392 can be pre-processed by decreasing its resolution to have it conform to input dimensions of the classification model 170A, performing principal component analysis (PCA), padding the data to have it conform to input dimensions of the classification model 170A, and/or otherwise generating an altered version of the FMCW LIDAR data 392 before applying it as input. It is understood that the pre-processing performed, if any, will be dependent on the classification model 170A (e.g., its input dimensions and the input data based on which it was trained). Also, in some implementations the FMCW LIDAR data 392 is from only a most recent sensing cycle of the FMCW LIDAR component 132. In some other implementations, the FMCW LIDAR data 392 can include FMCW LIDAR data from a most recent sensing cycle of the FMCW LIDAR component 132, as well FMCW LIDAR data from one or more prior sensing cycles of the FMCW LIDAR component 132 (e.g., from immediately preceding sensing cycles).

The output 393A generated based on the processing using the classification model 170A includes, for each of a plurality of spatial regions$_{1-N}$, a corresponding probability for each of classes$_{1-N}$. Each of the spatial regions$_{1-N}$ of the output 393A corresponds to a portion of the FMCW LIDAR data 392 and, as a result, corresponds to an area of the environment. For example, the FMCW LIDAR data 392 can include a 3D point cloud defining a corresponding range (via its 3D coordinate in the 3D point cloud), corresponding velocity, and optionally a corresponding intensity. In such an example, each of the spatial regions$_{1-N}$ can correspond to one or more of the 3D points (e.g., a single point or a collection of neighboring points). For instance, each of the spatial regions$_{1-N}$ can correspond to one of the 3D points of the FMCW LIDAR data 392. As an alternative instance, each of the spatial regions 1-N can correspond to a collection of neighboring 3D points of the FMCW LIDAR data 392 (e.g., each spatial region can correspond to a collection of eight of the 3D points, thereby enabling the quantity of spatial regions to be one eighth of the quantity of 3D points). As another example, where the FMCW LIDAR data 392 includes a range-Doppler image, each of the spatial regions$_{1-N}$ can correspond to one or more pixels (e.g., a single pixel or a collection of neighboring pixels) of the range-Doppler image.

Each of the probabilities of the output 393A for each of the spatial regions$_{1-N}$ corresponds to one of 1-N classes. For example, the class$_1$ probability can be a probability of a vehicle class, the class$_2$ probability can be a probability of a pedestrian class, the class$_3$ probability can be a probability of a bicyclist class, etc. It is noted that while N is utilized to reference the total quantity of spatial regions$_{1-N}$, and to reference the total quantity of classes$_{1-N}$ in output 393A, the total quantity of spatial regions$_{1-N}$ and the total quantity of classes$_{1-N}$ can vary from one another in various implementations. As one non-limiting example, over a thousand spatial regions can be provided, whereas only fifty or less classes can be provided.

The object detection and classification module 154A can utilize the output 393A to determine pose(s) and class(es) for object(s) 394. For example, the object detection and classification module 154A can determine that no objects are present in those spatial regions$_{1-N}$ whose class$_{1-N}$ probabilities each fail to satisfy a threshold low probability (e.g., 0.2, 0.3, or other probability). Also, for example, the object detection and classification module 154A can determine those spatial regions$_{1-N}$ having one or more of the class$_{1-N}$ probabilities that satisfy a threshold high probability likely contain an object. Further, the object detection and classification module 154A can determine clusters of neighboring (directly neighboring or within N (e.g., 1, 2, or 3) spatial regions) spatial regions that have probabilities satisfying a threshold for the same class(es) and determine they correspond to the same object of those class(es). For example, if spatial regions$_{20-30}$ are neighboring and all have a probability for class$_1$ that satisfies a threshold, the object detection and classification module 154A can determine spatial regions$_{20-30}$ correspond to a single object of class$_1$. Yet further, the object detection and classification module 154A can determine the pose of that single object based on those spatial regions$_{20-30}$. For example, the module 154A can determine the object has a pose corresponding to the FMCW LIDAR data 392 that corresponds to spatial regions$_{20-30}$. The determined pose can be with reference to the FMCW LIDAR data 392, or with reference to another frame (e.g., a world frame or other reference frame).

Figure 3C:
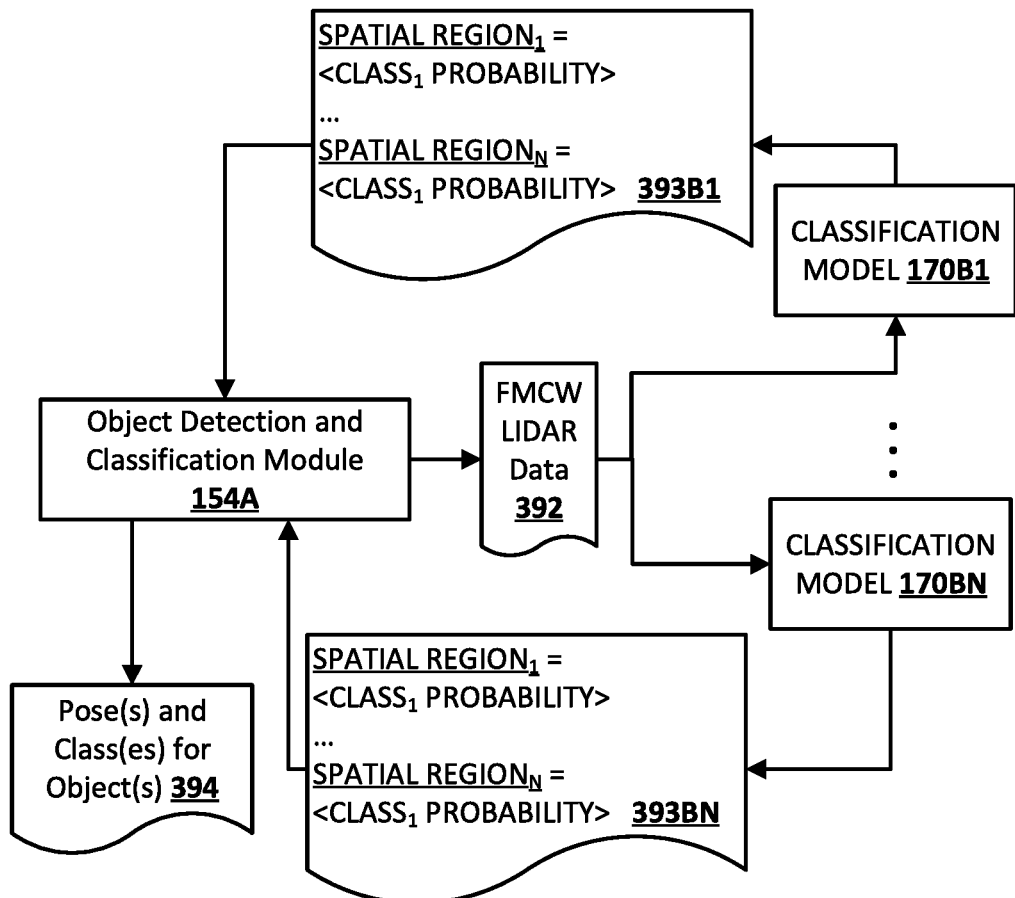
FIG. 3C is a block diagram illustrating another example how classification(s) for object(s) in an environment of a vehicle can be determined in FIG. 3A.

FIG. 3C is a block diagram illustrating another example of how pose(s) and class(es) for object(s) 394 of FIG. 3A can be determined utilizing a collection of classification models 170B1-170BN. Classification models 170B1-170BN are one example of classification model(s) 170 of FIG. 3A. In FIG. 3B, classification model 170A is trained to generate output 393A that provides, for each of a plurality of spatial regions$_{1-N}$, a corresponding probability for each of classes$_{1-N}$. In contrast, in FIG. 3C, each of the classification models 170B1-170BN is trained to generate corresponding output that provides, for each of a plurality of spatial regions$_{1-N}$, a corresponding probability for only one corresponding class.

In FIG. 3C, the object detection and classification module 154A applies FMCW LIDAR data 392 as input to each of classification models 170B1-170BN, processes the FMCW LIDAR data 392 using models 170B1-170BN, and generates outputs 393B1-393BN based on the processing. In some implementations, the FMCW LIDAR data 392 is applied in the same form as it is received from the FMCW LIDAR component 136. In some other implementations, pre-processing of the FMCW LIDAR data 392 is performed prior to applying it as input.

The output 393B1 generated based on the processing using the classification model 170B1 includes, for each of a plurality of spatial regions$_{1-N}$, a corresponding probability for class$_1$. The output 393BN generated based on the processing using the classification model 170BN includes, for each of a plurality of spatial regions$_{1-N}$, a corresponding probability for class$_N$. The unillustrated outputs generated based on the processing using the classification models 170B2-170B(N−1) each includes, for each of the plurality of spatial regions$_{1-N}$, a corresponding probability for a corresponding single class. Each of the spatial regions$_{1-N}$ of the outputs 393B1-393BN corresponds to a portion of the FMCW LIDAR data 392 and, as a result, corresponds to an area of the environment.

The object detection and classification module 154A can utilize the outputs 393B1-393BN to determine pose(s) and class(es) for object(s) 394. For example, the object detection and classification module 154A can determine that no objects are present in those spatial regions$_{1-N}$ whose class$_{1-N}$ probabilities indicated by outputs 393BA-393BN each fail to satisfy a threshold low probability (e.g., 0.2, 0.3, or other probability). Also, for example, the object detection and classification module 154A can determine those spatial regions$_{1-N}$ having one or more of the class$_{1-N}$ probabilities indicated by outputs 393BA-393BN that satisfy a threshold high probability likely contain an object of those class(es). Further, the object detection and classification module 154A can determine clusters of neighboring (directly neighboring or within N (e.g., 1, 2, or 3) spatial regions) spatial regions that have probabilities satisfying a threshold for the same class(es) and determine they correspond to the same object of that class. Yet further, the object detection and classification module 154A can determine the pose of that single object based on those spatial regions.

Figures 4A, 4B:
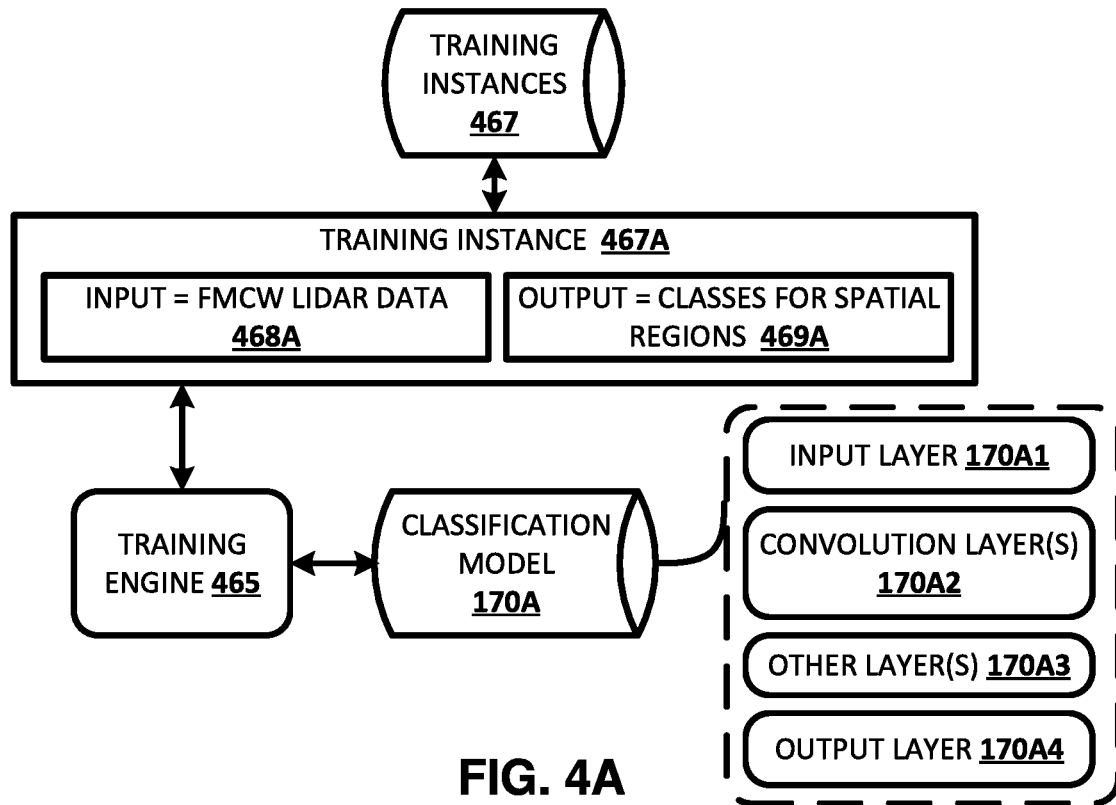
FIG. 4A illustrates an example of how a training engine can train a classification model utilizing a training instance, according to implementations disclosed herein.
FIG. 4B illustrates an example training instance output of the training instance of FIG. 4A.

Turning now to FIG. 4A, an example is illustrated of a training engine 465 training the classification model 170A of FIG. 3A utilizing a training instance 467A of training instances database 467. The training engine 465 can train the classification model 170A prior to its usage in FIG. 3A. The training instance 467A includes a training instance input 468A that includes FMCW LIDAR data (e.g., FMCW LIDAR data from a sensing cycle, or from a plurality of sequential sensing cycles). The training instance 467A also includes a training instance output 469A, that defines, for each of a plurality of spatial regions, whether an object of one or more classes is present in the spatial region. Training instance output 469A is illustrated more particularly in FIG. 4B. Training instance output 469A defines a plurality of spatial regions$_{1-N}$, and, for each of the spatial regions$_{1-N}$, a corresponding probability for each of classes$_{1-N}$. For example, if only one object having only class$_1$ is present in spatial regions$_{1-6}$, the class$_1$ probability for each of spatial regions$_{1-5}$ can be "1", the probabilities for each of classes$_{6-N}$ can be "0" for spatial regions$_{1-6}$, and the probabilities for each of classes$_{1-N}$ can be "0" for spatial regions$_{6-N}$. The training instance output 469A can, in some implementations, be based on manual annotations of FMCW LIDAR data that indicate classes of objects present in the FMCW LIDAR data.

Turning again to FIG. 4A, in training the classification model 170A, the training engine 465 applies the training instance input 468A to the classification model 170A, and processes the training instance input 468A, utilizing the classification model 170A and based on current parameters of the classification model 170A, to generate an output having a dimension that conforms to the dimension of training instance output 469A. The training engine 465 then compares the generated output to the training instance output 469A, and updates one or more parameters of the classification model 170A based on the comparison. For example, the training engine 465 can generate an error based on differences between the generated output and the training instance output 469A, and backpropagate a loss (that is based on the error) over classification model 170A to update the classification model 170A. Although only a single training instance 467A is illustrated in FIG. 4A, classification model 170A will be trained based on a large quantity of training instances of training instances database 467. Those training instances can collectively include training instance inputs with diverse FMCW LIDAR data and diverse training instance outputs. Moreover, although non-batch training is described with respect to FIG. 4A, batch training may additionally or alternatively be utilized (e.g., where losses are based on errors determined based on a batch of training instances).

FIG. 4A also illustrates, within dashed lines, example layers that may be included in classification model 170A. In particular, an input layer 170A1, convolution layer(s) 170A2, other layer(s) 170A3, and an output layer 170A4 are illustrated. As described herein, the dimensions/shape of the input layer 170A1 can be dependent on the shape of the FMCW LIDAR data to be applied. Also, the dimensions/shape of the output layer 170A4 can be dependent on the size of the spatial regions, how many class probabilities are to be predicted, etc. In some implementations, multiple convolution layer(s) 170A2 are provided, and max pooling and/or other layers may optionally be interposed between one or more of the convolution layer(s) 170A2. The other layer(s) 170A3 can include such max pooling layers and/or affine layers such as a softmax layer(s) and/or fully connected layer(s) that precede the output layer 170A4. Although FIG. 4A illustrates example layers that may be included in classification model 170A, additional and/or alternative layers can be included in other implementations. For example, other implementations may not include any convolution layer(s) and/or not include any max pooling layers. For instance, they can instead include alternative layer(s) between the input layer 170A1 and the output layer 170A4.

Figure 5:
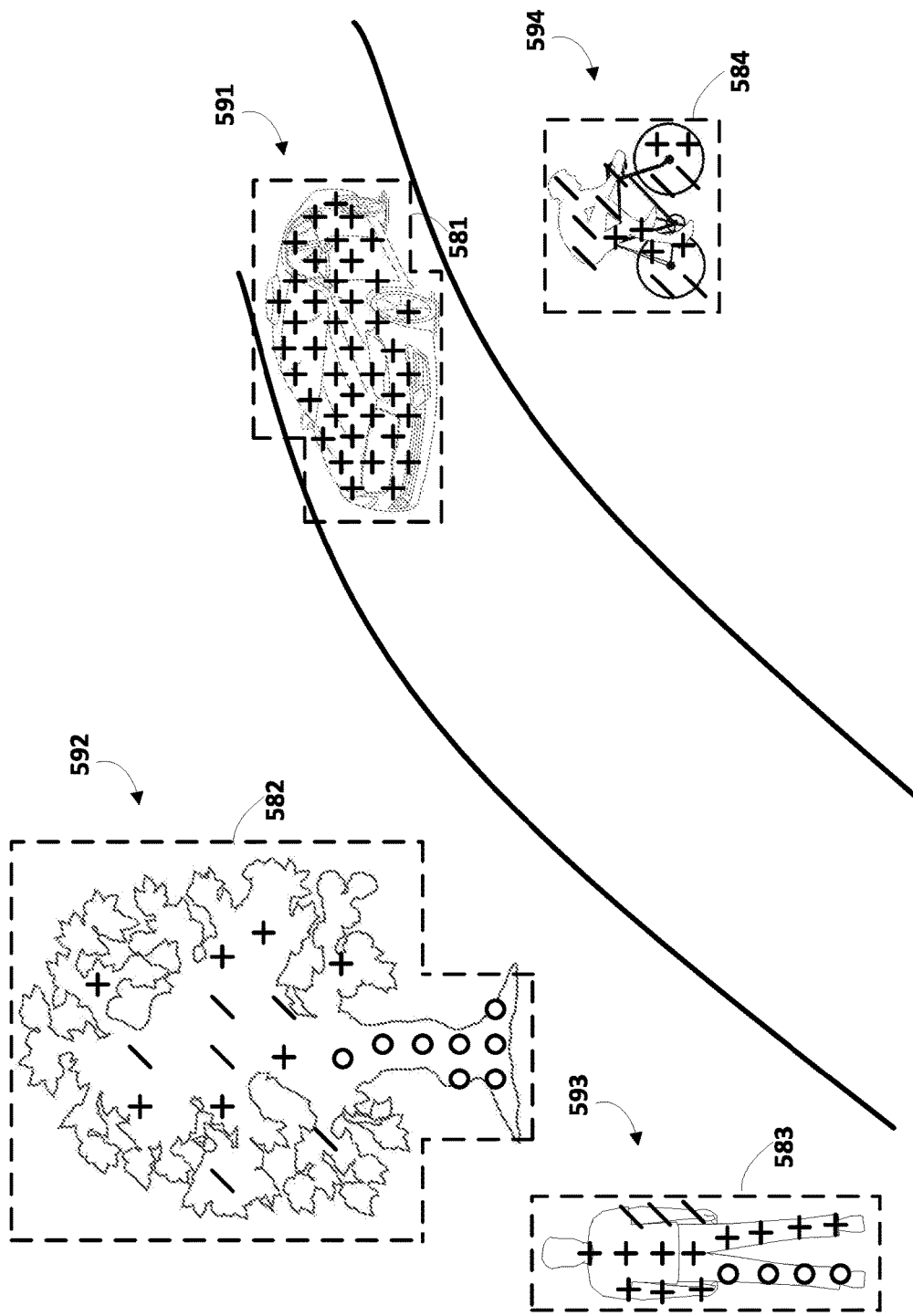
FIG. 5 illustrates an example environment of a vehicle with multiple environmental objects, and also illustrates examples of some FMCW LIDAR data points that can correspond to the environmental objects.

Turning now to FIG. 5, an example environment of a vehicle is illustrated. The environment includes multiple environmental objects 591-594, and also illustrates examples of some FMCW LIDAR data points that can correspond to the environmental objects. The example FMCW LIDAR data points are illustrated as plus signs (+), minus signs (−), and circles (○). The FMCW LIDAR data points can be, for example, from an instance of (e.g., a sensing cycle of) FMCW LIDAR data that is a 3D point cloud, where each of the points of the 3D point cloud indicates a corresponding range (through its position in the 3D point cloud), and includes a corresponding rate/velocity, and optionally a corresponding intensity value. The plus signs (+) indicate FMCW LIDAR data points that have a positive corresponding velocity value, the minus signs (−) indicate FMCW LIDAR data points that have a negative corresponding velocity value, and the circles (○) indicate FMCW LIDAR data points that have a zero (or near-zero) corresponding velocity value. It is noted that although positive velocity values are all indicated by plus signs (+), and negative velocity values are all indicated by minus signs (−), the magnitudes of those velocity values can vary (e.g., velocity values for the vehicle 591 can be greater than those for the pedestrian 593). Also, it is understood that additional FMCW LIDAR data points will be provided with the FMCW LIDAR data, including additional points that correspond to the objects 591-594—as well as additional points that correspond to additional environmental objects. However, only some of the FMCW LIDAR data points are illustrated in FIG. 5 for simplicity. Moreover, it is understood that the objects 591-594 will not be rendered in the FMCW LIDAR data as they appear in FIG. 5 (although they may be visually ascertainable via corresponding FMCW LIDAR data points). However, the objects 591-594 are illustrated in FIG. 5 for reference purposes. Additionally, it is understood that while FIG. 5 is described with respect to FMCW LIDAR data points, additional or alternative types of FMCW LIDAR data can be utilized in determining poses, classifications, and movement parameters, such as those types of FMCW LIDAR data also described herein.

In FIG. 5, bounding shapes 581-584 are each depicted around a corresponding one of the objects 591-594. The bounding shapes 581-584 each indicate a subgroup of FMCW LIDAR data that may correspond to a corresponding one of the objects 591-594 and, as a result, each indicate a pose of a corresponding one of the objects 591-594. Each pose can be a multi-dimensional pose, such as a three-dimensional (3D) pose that indicates position, or a six-dimensional (6D) pose that indicates position as well as orientation. As described herein, the object detection and classification module 154A can determine the bounding shapes 581-584 based on processing of the FMCW LIDAR data utilizing a classification model 170, and can further determine, utilizing the classification model 170, a corresponding classification for each of the objects 591-594 encompassed by the bounding shapes 581-584. Although particular bounding shapes are illustrated, it is understood that other bounding shapes can additionally or alternatively be determined and utilized.

In FIG. 5, bounding shape 581 encompasses FMCW LIDAR data points that correspond to an additional vehicle 591. Each of the FMCW LIDAR data points within the bounding shape 581 corresponds to the additional vehicle 591 and is indicated with a plus sign (+), which means it has a positive corresponding velocity value (relative to the FMCW LIDAR component 132 of the vehicle 100). The object detection and classification module 154A can determine the bounding shape 581 based on processing the FMCW LIDAR data over a classification model 170, to generate output that indicates neighboring spatial regions that each have a classification probability for vehicle that satisfies a threshold. The neighboring spatial regions can conform to the bounding shape 581, and they indicate the pose for the additional vehicle 591. Further, the velocity module 154B can determine an instantaneous velocity for the additional vehicle 592 based on the FMCW LIDAR data points encompassed by the bounding shape 581. For example, the velocity module 154B can determine the instantaneous velocity based on a mean of the velocities indicated by the FMCW LIDAR data encompassed by the bounding shape 581. As described, in some implementations the velocity module 154B can determine the instantaneous velocity utilizing a technique that is selected based on the object detection and classification module 154A determining the classification of vehicle.

In FIG. 5, bounding shape 582 encompasses FMCW LIDAR data points that correspond to a tree 592. Each of the FMCW LIDAR data points within the bounding shape 592 corresponds to the tree 592. As illustrated, some of the FMCW LIDAR data points that correspond to the branches and/or foliage of the tree 592 are indicated with a plus sign (+), while others are indicated with a minus sign (−). This can be due to the branches/foliage moving in different directions (e.g., due to wind) and having different directions of velocities. Some of the FMCW LIDAR data points that correspond to the trunk of the tree 592 are indicated with a circle (○), which means they have a zero (or near-zero) velocity. The object detection and classification module 154A can determine the bounding shape 582 based on processing the FMCW LIDAR data over the classification model 170, to generate output that indicates neighboring spatial regions that each have a classification probability for "tree" that satisfies a threshold. The neighboring spatial regions can conform to the bounding shape 582, and they indicate the pose for the tree. In some implementations, the velocity module 154B can skip any determination of an instantaneous velocity for the tree 592 based on its classification as determined by the object detection and classification module 154A.

In FIG. 5, bounding shape 583 encompasses FMCW LIDAR data points that correspond to a pedestrian 593. Each of the FMCW LIDAR data points within the bounding shape 583 corresponds to the pedestrian 593. Some of those are indicated with a plus sign (+), (which means they have a positive corresponding velocity value), while others are indicated with a minus sign (−) (which means they have a negative corresponding velocity value), while yet others are indicated with a circle (○) (which means they have a zero or near-zero corresponding velocity value). These differing velocity directions on the pedestrian 593 can be due to the pedestrian walking during the sensing cycle. The object detection and classification module 154A can determine the bounding shape 583 based on processing the FMCW LIDAR data over a classification model 170, to generate output that indicates neighboring spatial regions that each have a classification probability for "pedestrian" that satisfies a threshold. The neighboring spatial regions can conform to the bounding shape 583, and they indicate the pose for the pedestrian 593. Further, the velocity module 154B can optionally determine an instantaneous velocity for the pedestrian 593 based on the FMCW LIDAR data points encompassed by the bounding shape 583. For example, the velocity module 154B can determine the instantaneous velocity based on a median of the velocities indicated by the FMCW LIDAR data encompassed by the bounding shape 583. As described, in some implementations the velocity module 154B can determine the instantaneous velocity utilizing a technique that is selected based on the object detection and classification module 154A determining the classification of "pedestrian".

In FIG. 5, bounding shape 584 encompasses FMCW LIDAR data points that correspond to a bicyclist 594. Each of the FMCW LIDAR data points within the bounding shape 584 corresponds to the bicyclist 594. Some of those are indicated with a plus sign (+), (which means they have a positive corresponding velocity value), while others are indicated with a minus sign (−). The differing velocity directions on the wheels of the bicycle of the bicyclist 594 can be due to the wheels rotation of the wheels. The differing velocity directions between the body of the bicyclist 594 and one of the legs of the bicyclist 594 can be due to the one leg moving in an opposite direction due to pedaling of the bicyclist during the sensing cycle. The object detection and classification module 154A can determine the bounding shape 584 based on processing the FMCW LIDAR data over a classification model 170, to generate output that indicates neighboring spatial regions that each have a classification probability for "bicyclist" that satisfies a threshold. The neighboring spatial regions can conform to the bounding shape 584, and they indicate the pose for the bicyclist 594. Further, the velocity module 154B can optionally determine an instantaneous velocity for the bicyclist 594 based on the FMCW LIDAR data points encompassed by the bounding shape 584. For example, the velocity module 154B can determine the instantaneous velocity based on histogram analysis of the velocities indicated by the FMCW LIDAR data encompassed by the bounding shape 584. As described, in some implementations the velocity module 154B can determine the instantaneous velocity utilizing a technique that is selected based on the object detection and classification module 154A determining the classification of "bicyclist".

Figure 6:
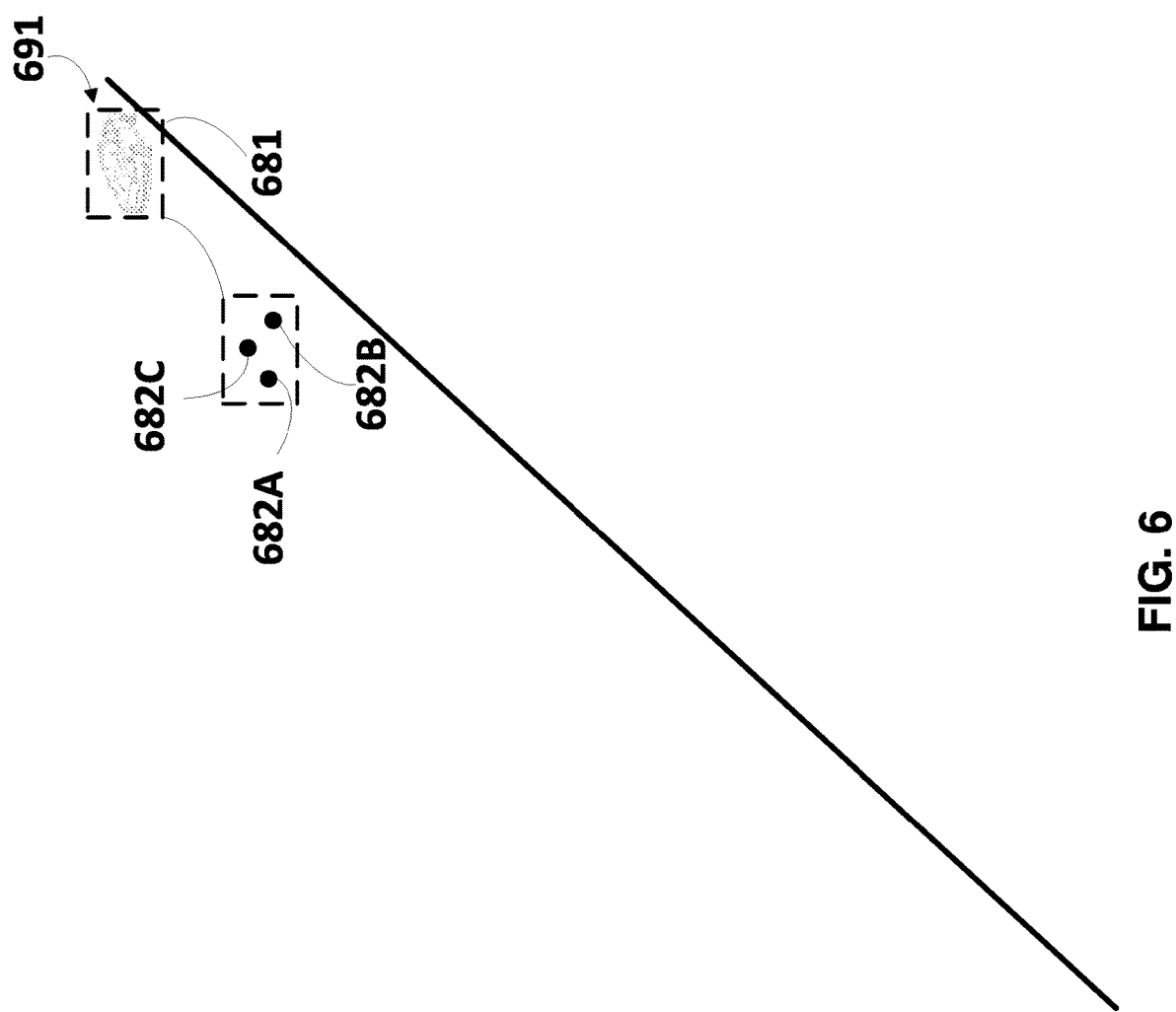
FIG. 6 illustrates another example environment of a vehicle with an additional vehicle, and also illustrates examples of some FMCW LIDAR data points that can correspond to the additional vehicle.

In FIG. 6, another example environment of a vehicle is illustrated. The environment includes an additional vehicle 691, and also illustrates three FMCW LIDAR data points 682A, 682B, and 682C that correspond to the additional vehicle 691. The FMCW LIDAR data points can be, for example, from an instance of (e.g., a sensing cycle of) FMCW LIDAR data that is a 3D point cloud, where each of the points of the 3D point cloud indicates a corresponding range (through its position in the 3D point cloud), and includes a corresponding rate/velocity, and optionally a corresponding intensity value. It is understood that additional FMCW LIDAR data points will be provided with the FMCW LIDAR data, such as additional points that correspond to additional environmental objects. However, only some of the FMCW LIDAR data points are illustrated in FIG. 6 for simplicity. Moreover, it is understood that additional vehicle 691 will not be rendered in the FMCW LIDAR data as it appears in FIG. 6, but is illustrated in FIG. 6 for reference purposes. Additionally, it is understood that while FIG. 6 is described with respect to FMCW LIDAR data points, additional or alternative types of FMCW LIDAR data can be utilized in determining poses, classifications, and movement parameters, such as those types of FMCW LIDAR data also described herein.

In FIG. 6, the additional vehicle 691 is far away from the FMCW LIDAR component. The FMCW LIDAR data points

682A, 682B, and 682C in FIG. 6 can be FMCW LIDAR monopulse data points generated by an FMCW LIDAR monopulse component. The example of FIG. 6 is one example of where FMCW LIDAR monopulse data points can be particularly beneficial. Namely, it illustrates a situation where the increased angular accuracy of the FMCW LIDAR monopulse component enables three FMCW LIDAR data points 682A, 682B, and 682C to be determined, whereas fewer (e.g., two, one, or none) may have been determinable with a FMCW LIDAR non-monopulse component. While FIG. 6 is one example, it is noted that FMCW LIDAR data points of FIG. 5 can also be FMCW LIDAR monopulse data points and can also be beneficial since, for example, it increases the angular accuracy of FMCW LIDAR data for the additional objects that can be utilized in determining poses, classifications, and movement parameters according to implementations disclosed herein. Such increased angular accuracy of FMCW LIDAR data can result in more accurate pose, classification, and/or movement parameter determinations in some implementations.

In FIG. 6, bounding shape 681 is depicted around the additional vehicle 691, and indicates a subgroup of FMCW LIDAR data that corresponds to the additional vehicle 691 and, as a result, indicates a pose of the additional vehicle 691. The object detection and classification module 154A can determine the bounding shape 681 based on processing of the FMCW LIDAR data utilizing a classification model 170, and can further determine, utilizing the classification model 170, a classification of vehicle for the object encompassed by bounding shape 681. Further, the velocity module 154B can determine an instantaneous velocity for the additional vehicle 691 based on the FMCW LIDAR data points 682A, 682B, and 682C. For example, the velocity module 154B can determine the instantaneous velocity based on a largest magnitude of the velocities indicated by the FMCW LIDAR points 682A, 682B, and 682C. In some implementations the velocity module 154B can determine the instantaneous velocity utilizing the largest magnitude based on the relatively low quantity of FMCW LIDAR data points corresponding to the additional vehicle 691.

Poses, classifications, and/or velocities of environmental objects determined according to techniques described herein can be utilized in control of an ego vehicle. Some examples of such adaptation is described with respect to FIGS. 7A and 7B, which each illustrate an example of how the vehicle 100 can be autonomously controlled based on such considerations.

Figure 7A:
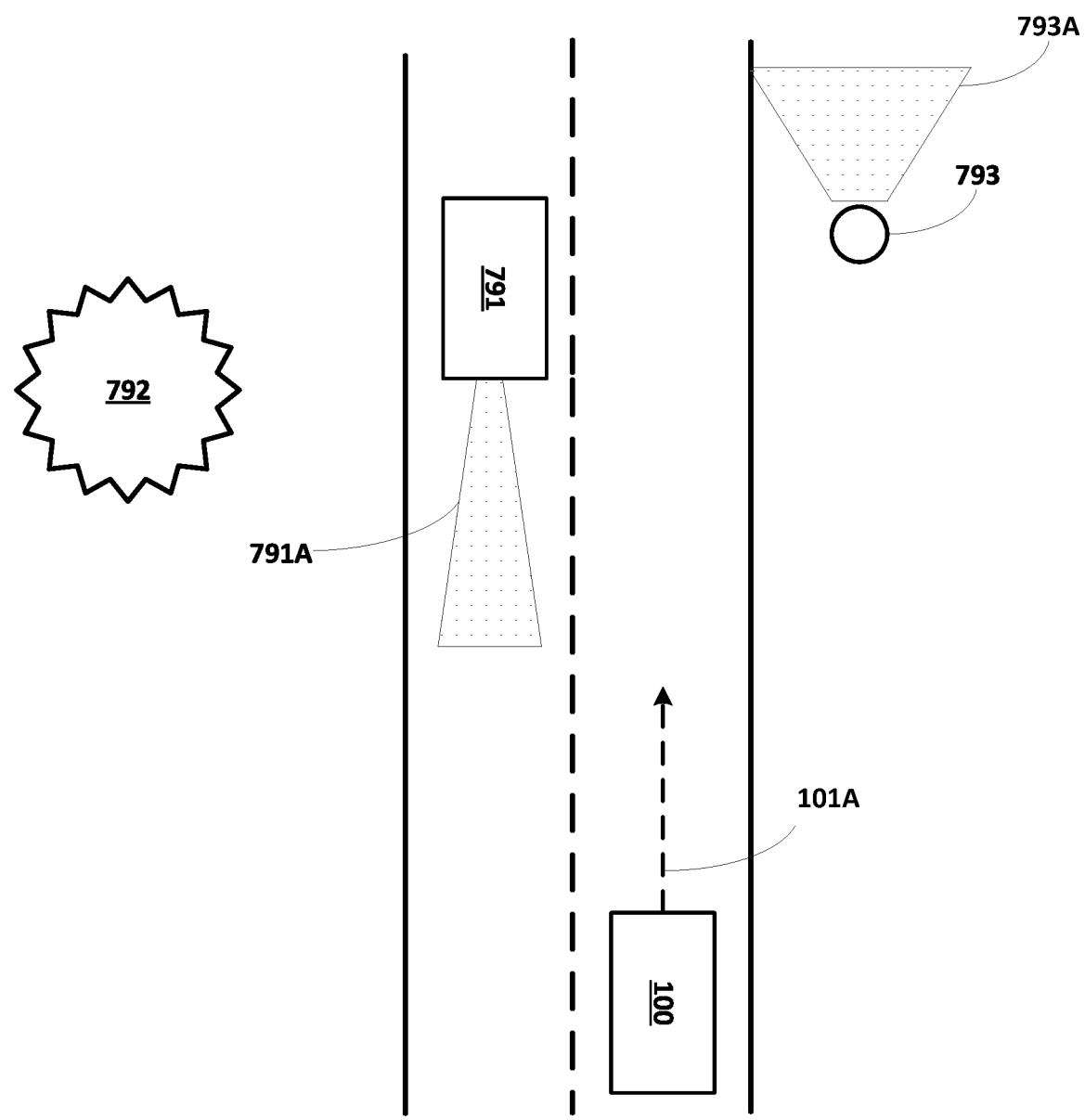
FIG. 7A illustrates an example of how a candidate trajectory (if any) can be determined for each of a plurality of objects based on classifications of those objects and/or instantaneous velocities for those objects, and how autonomous control of a vehicle can be adapted based on the candidate trajectories.

FIG. 7A illustrates an example of how a candidate trajectory (if any) can be determined for each of a plurality of objects 791, 792, and 793 based on classifications of those objects and/or instantaneous velocities for those objects, and how autonomous control of the vehicle 100 can be adapted based on the candidate trajectories.

In FIG. 7A, a vehicle 791, a tree 792, and a bicyclist 793 are illustrated from a birds-eye view. The object detection and classification module 154A can determine corresponding classifications for the vehicle 791, tree 792, and bicyclist 793 utilizing techniques described herein. The object detection and classification module 154A can further determine corresponding poses for the vehicle 791, tree 792, and bicyclist 793 utilizing techniques described herein. Further, the velocity module 154B can determine an instantaneous velocity for the vehicle 791 and an instantaneous velocity for the bicyclist 793 utilizing techniques described herein.

The planning subsystem 156 can utilize the pose and the instantaneous velocity of the vehicle 791 to determine a candidate trajectory 791A of the additional vehicle 791. Further, the planning subsystem 156 can utilize the pose and the instantaneous velocity of the bicyclist 793 to determine a candidate trajectory 793A of the bicyclist 793. It is noted that no candidate trajectory is determined for the tree 792, as it is of a classification that indicates a static/non-mobile object. Further, it is noted that in various implementations the velocity module 154B may, based on a determined classification of the tree 792, not determine any velocity for the tree 792.

The planning subsystem 156 can utilize at least the candidate trajectories 791A and 793A in determining a trajectory 101A for the ego vehicle 100. The trajectory 101A can be determined and implemented over a period of time and represents a straight-line continuation of a current trajectory of the ego vehicle 100 since, as can be appreciated from viewing FIG. 7A, the candidate trajectories 791A and 793A will not cause the objects 791 or 793 to be too proximal to ego vehicle 100 to warrant adapting of the trajectory. Further, tree 792 will not alter the trajectory as it is not in the path of the ego vehicle 100 and its classification indicates that it is non-mobile.

Figure 7B:
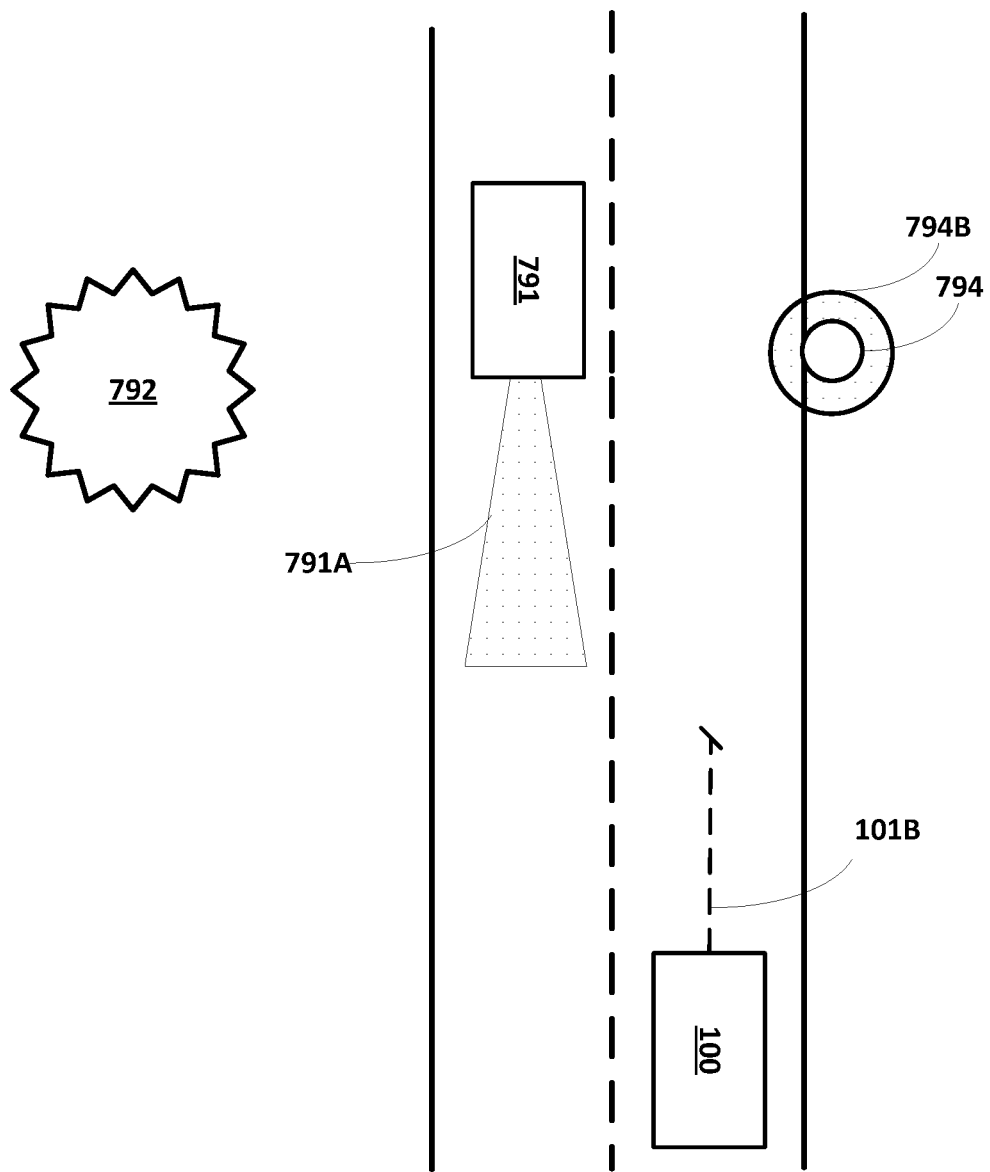
FIG. 7B illustrates another example of how a candidate trajectory (if any) can be determined for each of a plurality of objects based on classifications of those objects and/or instantaneous velocities for those objects, and how autonomous control of a vehicle can be adapted based on the candidate trajectories.

FIG. 7B illustrates another example of how a candidate trajectory (if any) can be determined for each of a plurality of objects 791, 792, and 794 based on classifications of those objects and/or instantaneous velocities for those objects, and how autonomous control of the vehicle 100 can be adapted based on the candidate trajectories.

In FIG. 7B, a vehicle 791, a tree 792, and a pedestrian 794 are illustrated from a birds-eye view. The object detection and classification module 154A can determine corresponding classifications for the vehicle 791, tree 792, and pedestrian 794 utilizing techniques described herein. The object detection and classification module 154A can further determine corresponding poses for the vehicle 791, tree 792, and pedestrian 794 utilizing techniques described herein. Further, the velocity module 154B can determine an instantaneous velocity for the vehicle 791 utilizing techniques described herein. Optionally, the velocity module 154B does not determine an instantaneous velocity for the tree 792 or for the pedestrian 794.

The planning subsystem 156 can utilize the pose and the instantaneous velocity of the vehicle 791 to determine a candidate trajectory 791A of the additional vehicle 791. The trajectory 791A is the same as that illustrated in FIG. 7A. Further, the planning subsystem 156 can utilize the pose of the pedestrian 794, and the classification of the pedestrian 794 as a pedestrian to determine a candidate trajectory 794B of the pedestrian 794. The candidate trajectory 794B extends in an area around the pedestrian and can be based on, for example, a default maximum velocity for a pedestrian classification and/or a default maximum distance a pedestrian could traverse prior to a next sensing cycle (in which an updated pose of the pedestrian 794 could be determined). It is noted that no candidate trajectory is determined for the tree 792, as it is of a classification that indicates a static/non-mobile object.

The planning subsystem 156 can utilize at least the candidate trajectories 791A and 794A in determining a trajectory 101B for the ego vehicle 100. The trajectory 101B can be determined and implemented over a period of time, and represents a deceleration of the current trajectory of the ego vehicle 100 since, as can be appreciated from viewing FIG. 7B, the candidate trajectory 794A of pedestrian 794 may cause the pedestrian to be too proximal to ego vehicle 100, unless the ego vehicle is decelerated. Further, deceleration of the ego vehicle 100 can be chosen in lieu of steering away from the pedestrian 794 in view of the candidate trajectory 791A (e.g., steering away may cause the vehicle to be too proximal to the candidate trajectory 791A of the additional vehicle 791).

FIGS. 7A and 7B each illustrates control of the ego vehicle 100 at a corresponding given instance based on poses, classifications, and/or movement parameters of environmental objects at the given instance. However, it is understood that control of the ego vehicle 100 will continue at each of a plurality of additional instances based on poses, classifications, and/or movement parameters of environmental objects at each of those additional instances, thereby enabling control of the ego vehicle 100 to be continuously adapted.

Figure 8:
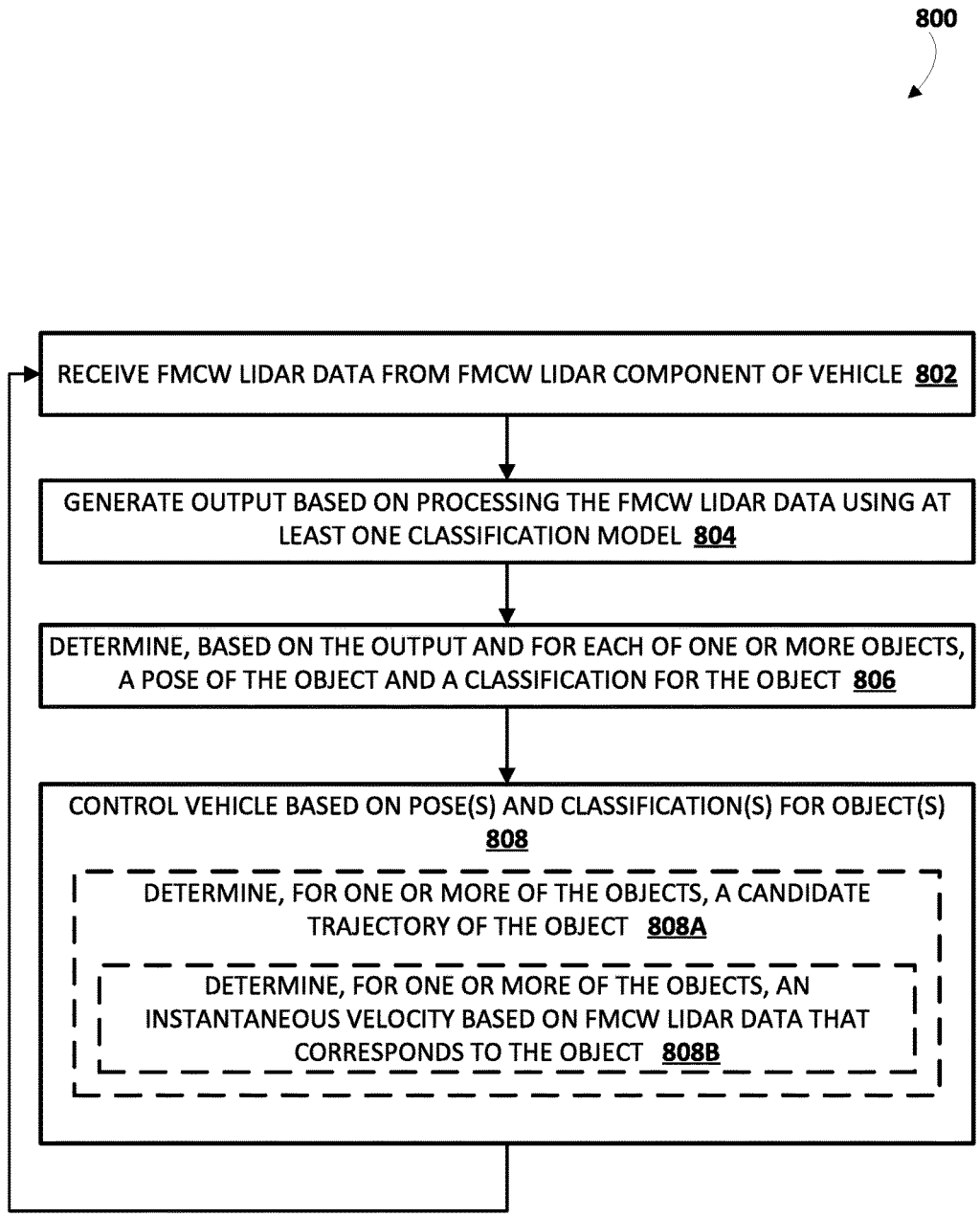
FIG. 8 is a flowchart illustrating an example method of determining classification(s) for object(s) in an environment of a vehicle, and controlling the vehicle based on the classification(s).

Turning now to FIG. 8, a flowchart is provided illustrating an example method 800 of determining pose(s) and classification(s) for environmental object(s) based on FMCW LIDAR data, and controlling an autonomous vehicle based on at least some of the pose(s) and classification(s). For convenience, the operations of the flow chart are described with reference to a system that performs the operations. This system may include various components, such as one or more processors of the autonomous vehicle 100 of FIG. 1. Moreover, while operations of method 800 are shown in a particular order, this is not meant to be limiting. One or more operations may be reordered, omitted or added.

At block 802, the system receives FMCW LIDAR data from an FMCW LIDAR component of a vehicle. In some implementations, the received FMCW LIDAR data at an iteration of block 802 can be a most recent unprocessed (unprocessed using method 800) instance of data generated by the FMCW LIDAR component. The instance of data can be generated by the FMCW LIDAR component during a sensing cycle and can be received by the system, for example, as part of a stream, as data packet(s), or via accessing shared memory. In some implementations, the received FMCW LIDAR data at an iteration of block 802 includes only the most recent unprocessed instance of data generated by the FMCW LIDAR component. In some other implementations, the received FMCW LIDAR data at an iteration of block 802 also includes one or more prior instances of data generated by the FMCW LIDAR component, such as the most recent N instances of data generated by the FMCW LIDAR component.

At block 804, the system generates output based on processing the FMCW LIDAR data, received at block 802, using at least one classification model. For example, the at least one classification model can include a trained neural network model and the generated output can include, for each of a plurality of spatial regions$_{1-N}$, a corresponding probability for each of one or more classes. In such an example, each of the spatial regions$_{1-N}$ of the output can correspond to a portion of the FMCW LIDAR data and, as a result, corresponds to an area of the environment. Each of the probabilities of the output for each of the spatial regions corresponds to a classification. For example, the output generated using a classification model can indicate, for each of the spatial regions$_{1-N}$, a first probability of a vehicle class, a second probability of a pedestrian class, a third probability of a bicyclist class, etc. As another example, the output generated using a classification model can indicate, for each of the spatial regions$_{1-N}$, a corresponding probability for only a single class, such as a vehicle class. In those or other examples, multiple classification models can be utilized, each being configured to predict probabilities, for spatial regions, for a subset of classes (e.g., only a single class).

At block 806, the system determines, based on the output and for each of one or more objects, a pose of the object and a classification for the object. For example, the system can determine, based on output of spatial regions$_{1-N}$ and corresponding class probabilities, that no objects are present in those spatial regions$_{1-N}$ whose class probabilities each fail to satisfy a threshold low probability. Also, for example, the system can determine that those spatial regions$_{1-N}$ having a corresponding class probability that satisfies a threshold high probability likely contain an object of that class. Further, the system can determine clusters of neighboring (directly neighboring or within N (e.g., 1, 2, or 3) spatial regions) spatial regions that have probabilities satisfying a threshold for the same class and determine they correspond to a single object of that class. Yet further, the system can determine the pose of that single object based on those spatial regions. The determined pose can be with reference to the FMCW LIDAR data of block 802, or with reference to another frame.

At block 808, the system controls the vehicle based on the pose(s) and classification(s) for object(s) determined at block 806. For example, the system can generate a trajectory for the vehicle based on one or more of the poses and/or classifications determined at block 806. In some implementations, block 808 includes sub-block 808A. At sub-block 808A, the system determines, for one or more of the objects, a candidate trajectory for the object. In some implementations, the system may not determine a candidate trajectory for object(s) of certain class(es), such as objects having a classification that corresponds to an immobile object and/or that corresponds to an object that is mobile but has a relatively slow maximum velocity.

At sub-block 808A, the system can optionally determine a candidate trajectory for an object based on an instantaneous velocity for the object. In such a situation, sub-block 808A can include sub-block 808B, in which the system determines, for one or more of the objects, an instantaneous velocity based on FMCW LIDAR data that corresponds to the object. For example, the system can determine an instantaneous velocity for an object based on the velocities indicated by the FMCW LIDAR data (received at block 802) that correspond to the object. For instance, the pose of the object (determined at block 806) can be utilized to select a subgroup of FMCW LIDAR data that corresponds to the object, and the instantaneous velocity determined based on the velocities indicated by the FMCW LIDAR data of the subgroup. In some implementations, the system can select a particular technique for determining an instantaneous velocity of an object, from a plurality of candidate techniques, based on the determined classification for the object, the determined pose for the object, and/or based on the quantity of FMCW LIDAR data that is available for the object. In some implementations, at sub-block 808A, the system can optionally determine a candidate trajectory for an object based on its classification, and without reference to any instantaneous velocity for the object. For example, for an object of a pedestrian classification a candidate trajectory can be determined based on a default maximum instantaneous velocity for a pedestrian.

In implementations where block 808 includes sub-block 808A (and optionally sub-block 808B), the system can generate the trajectory for the vehicle based on one or more of the candidate trajectories generated at sub-block 808A (which are based on poses and/or classifications determined at block 806).

After block 808, the system proceeds back to block 802, where it receives new FMCW LIDAR data (e.g., the most recently generated data that has not yet been processed using method 800), and then proceeds to perform another iteration of blocks 802, 804, 806, and 808. Although illustrated serially in FIG. 8, a next iteration of block(s) 802, 804, and/or 806 can be performed in parallel with a prior iteration of one or more subsequent blocks (e.g., via multiple processor(s) and/or threads). Through continual iterations of the blocks of FIG. 8 while the vehicle is navigating, poses and classifications for environmental objects can be continuously determined to reflect changing environmental parameters, and the vehicle continuously autonomously controlled based on such determinations.

What is claimed is:

1. A method, comprising:
receiving, from a phase coherent Light Detection and Ranging (LIDAR) monopulse component of a vehicle, the phase coherent LIDAR monopulse component being a frequency-modulated continuous wave (FMCW) LIDAR monopulse component, a group of FMCW LIDAR data points collectively capturing a plurality of points in an area of an environment of the vehicle,
each of the FMCW LIDAR data points of the group indicating an instantaneous corresponding range and an instantaneous corresponding velocity for a corresponding one of the plurality of points in the environment, and each being generated based on a corresponding sensing event of the phase coherent FMCW LIDAR monopulse component,
wherein the corresponding sensing events of the phase coherent FMCW LIDAR monopulse component each comprise a first receiver sensing event at a first receiver of the phase coherent FMCW LIDAR monopulse component and a second receiver sensing event at a second receiver of the phase coherent FMCW LIDAR monopulse component;
determining that a subgroup, of the FMCW LIDAR data points of the group, corresponds to an object of a particular classification, the determining based on both:
the corresponding ranges for multiple of the FMCW LIDAR data points of the subgroup, and
the corresponding velocities for multiple of the FMCW LIDAR data points of the subgroup; and
adapting autonomous control of the vehicle based on determining that the subgroup corresponds to the object of the particular classification.

2. The method of claim 1, further comprising:
determining at least one instantaneous velocity of the object based on at least one of the corresponding velocities of the subgroup, wherein the at least one of the corresponding velocities of the subgroup is utilized in determining the at least one instantaneous velocity of the object based on the determining that the subgroup corresponds to the object;
wherein adapting autonomous control of the vehicle is further based on the at least one instantaneous velocity.

3. The method of claim 2, wherein determining the at least one instantaneous velocity based on the at least one of the corresponding velocities of the subgroup comprises determining the at least one instantaneous velocity based on a function of a plurality of the corresponding velocities of the subgroup.

4. The method of claim 2, wherein adapting autonomous control of the vehicle based on the at least one instantaneous velocity comprises:
determining at least one candidate trajectory of the object based on the at least one instantaneous velocity; and
adapting autonomous control of the vehicle based on the at least one candidate trajectory.

5. The method of claim 4, wherein determining the at least one candidate trajectory of the object based on the at least one instantaneous velocity comprises:
adapting a previously determined velocity, for the object, based on the at least one instantaneous velocity; and
determining the at least one candidate trajectory of the object based on the adaptation of the previously determined velocity.

6. The method of claim 2, wherein determining the at least one instantaneous velocity based on the at least one of the corresponding velocities of the subgroup comprises:
selecting an instantaneous velocity determination technique, from a plurality of candidate instantaneous velocity determination techniques, based on the instantaneous velocity determination technique being assigned to the particular classification; and
using the selected instantaneous velocity determination technique in determining the at least one instantaneous velocity.

7. The method of claim 2, wherein determining the at least one instantaneous velocity based on the at least one of the corresponding velocities of the subgroup comprises:
selecting an instantaneous velocity determination technique, from a plurality of candidate instantaneous velocity determination techniques, based on a quantity of the corresponding velocities of the subgroup; and
using the selected instantaneous velocity determination technique in determining the at least one instantaneous velocity.

8. The method of claim 1, wherein a corresponding angle is defined for each of the FMCW LIDAR data points of the group, and wherein the corresponding angles are each defined to a degree that is less than a beam-width of corresponding optical output, from a laser of the phase coherent FMCW LIDAR monopulse component, that resulted in the corresponding sensing event based on which the FMCW LIDAR data point is generated.

9. The method of claim 1, further comprising generating a corresponding angle for each of the FMCW LIDAR data points of the group, wherein generating a given corresponding angle, of the corresponding angles, for a given FMCW LIDAR data point of the FMCW LIDAR data points comprises:
generating the given corresponding angle based on comparing:
first data from the first receiver sensing event for the corresponding sensing event of the given FMCW LIDAR data point, and
second data from the second receiver sensing event for the corresponding sensing event of the given FMCW LIDAR data point.

10. The method of claim 9, wherein comparing the first data and the second data comprises comparing one or both of:
phase differences between the first data and the second data, and
amplitude differences between the first data and the second data.

11. The method of claim 10, wherein the first data and the second data are each a respective time varying intermediate frequency waveform, or a respective range-Doppler image.

12. The method of claim 1, wherein each of the FMCW LIDAR data points of the group is a corresponding super-resolution FMCW LIDAR data point constructed based on combining first data from the first receiver sensing event of the corresponding sensing event and second data from the second receiver sensing event of the corresponding sensing event.

13. The method of claim 1, wherein each of the FMCW LIDAR data points of the group further indicate a corresponding intensity, and wherein determining that the subgroup of the FMCW LIDAR data points of the group corresponds to the object of the particular classification is further based on the corresponding intensities for multiple of the FMCW LIDAR data points of the subgroup.

14. The method of claim 1, further comprising:
receiving, from the phase coherent FMCW LIDAR monopulse component immediately prior to receiving the group, a prior group of prior FMCW LIDAR data points that collectively capture a plurality of the plurality of points in the area of the environment of the vehicle,
each of the prior FMCW LIDAR data points of the prior group indicating a corresponding prior range and a corresponding prior velocity for the corresponding points in the environment, and each being generated based on a prior corresponding sensing event of the phase coherent FMCW LIDAR monopulse component;
wherein determining that the subgroup, of the FMCW LIDAR data points of the group, corresponds to the object of the particular classification is further based on both:
the corresponding prior ranges for multiple of the prior FMCW LIDAR data points, and
the corresponding prior velocities for multiple of the prior FMCW LIDAR data points.

15. The method of claim 1, wherein determining that the subgroup, of the FMCW LIDAR data points of the group, corresponds to the object of the particular classification comprises:
processing the FMCW LIDAR data points of the group using a trained machine learning model;
generating, based on processing of the FMCW LIDAR data points of the group using the trained machine learning model, an output that indicates that the subgroup has the particular classification; and
determining that the subgroup corresponds to the object having the particular classification based on the output indicating that the subgroup has the particular classification.

16. The method of claim 15,
wherein the output indicates, for each of a plurality of spatial regions of the FMCW LIDAR data points of the group, a corresponding probability that the corresponding spatial region has the particular classification, and
wherein determining that the subgroup corresponds to the object having the particular classification based on the output indicating that the subgroup has the particular classification comprises:
determining a set of one or more of the spatial regions based on the corresponding probabilities of the spatial regions of the set each satisfying a threshold; and
determining the subgroup based on the subgroup corresponding to the set of the one or more of the spatial regions.

17. The method of claim 16, wherein the spatial regions indicated by the output each correspond to either:
a corresponding one of the FMCW LIDAR data points of the group, or
a corresponding unique grouping of two or more of the FMCW LIDAR data points of the group.

18. The method of claim 16,
wherein the output indicates, for each of the plurality of spatial regions of the FMCW LIDAR data points of the group, a corresponding first probability that the corresponding spatial region has the particular classification and a corresponding additional probability that the corresponding spatial region has a distinct particular classification, and
wherein determining that the subgroup corresponds to the object having the particular classification based on the output indicating that the subgroup has the particular classification comprises:
determining a set of one or more of the spatial regions based on the corresponding probabilities of the spatial regions of the set each satisfying a threshold; and
determining the subgroup based on the subgroup corresponding to the set of the one or more of the spatial regions.

19. The method of claim 18, further comprising:
determining that an additional subgroup of the FMCW LIDAR data corresponds to an additional object having the distinct particular classification based on:
determining an additional set of one or more of the spatial regions based on the corresponding additional probabilities of the spatial regions of the additional set each satisfying a threshold; and
determining the additional subgroup based on the additional subgroup corresponding to the additional set of the one or more of the spatial regions;
wherein adapting autonomous control of the vehicle is further based on determining that the additional subgroup corresponds to the additional object having the distinct particular classification.

20. The method of claim 1, wherein adapting autonomous control of the vehicle based on determining that the subgroup corresponds to the object of the particular classification comprises altering at least one of:
a velocity of the vehicle, or
a direction of the vehicle.

21. The method of claim 17, wherein adapting autonomous control of the vehicle based on determining that the subgroup corresponds to the object of the particular classification comprises:
determining a pose of the object based on the FMCW LIDAR data points of the subgroup; and
adapting autonomous control based on the pose of the object and based on the particular classification of the object.

22. The method of claim 1, wherein adapting autonomous control of the vehicle based on determining that the subgroup corresponds to the object of the particular classification comprises:
determining that the object is mobile based on the particular classification;
determining a pose of the object based on the FMCW LIDAR data points of the subgroup;
determining, in response to determining that the object is mobile, at least one candidate trajectory for the object based on the pose of the object; and
adapting autonomous control of the vehicle based on the at least one candidate trajectory.

23. The method of claim 22, further comprising:
determining an instantaneous velocity of the object based on the FMCW LIDAR data points of the subgroup;
wherein determining the at least one candidate trajectory for the object is further based on the instantaneous velocity of the object.

24. An autonomous vehicle, comprising:
a phase coherent Light Detection and Ranging (LIDAR) monopulse component the phase coherent LIDAR monopulse component being a frequency-modulated continuous wave (FMCW) LIDAR monopulse component;
one or more processors executing stored computer instructions to:
receive, from the phase coherent FMCW LIDAR monopulse component, a group of phase coherent FMCW LIDAR data points collectively capturing a plurality of points in an area of an environment of the autonomous vehicle,
each of the phase coherent FMCW LIDAR data points of the group indicating an instantaneous corresponding range and an instantaneous, corresponding velocity for a corresponding one of the plurality of points in the environment, and each being generated based on a corresponding sensing event of the phase coherent FMCW LIDAR monopulse component,
wherein the corresponding sensing events of the phase coherent FMCW LIDAR monopulse component each comprise a first receiver sensing event at a first receiver of the phase coherent FMCW LIDAR monopulse component and a second receiver sensing event at a second receiver of the phase coherent FMCW LIDAR monopulse component;
determine that a subgroup, of the phase coherent FMCW LIDAR data points of the group, corresponds to an object of a particular classification, the determining based on both:
the corresponding ranges for multiple of the phase coherent FMCW LIDAR data points of the subgroup, and
the corresponding velocities for multiple of the phase coherent FMCW LIDAR data points of the subgroup; and
control steering, acceleration, and/or deceleration of the autonomous vehicle based on determining that the subgroup corresponds to the object of the particular classification.

25. A method, comprising:
receiving, from a phase coherent Light Detection and Ranging (LIDAR) monopulse component of a vehicle, the phase coherent LIDAR monopulse component being a frequency-modulated continuous wave (FMCW) LIDAR monopulse component, a group of FMCW LIDAR data points collectively capturing a plurality of points in an area of an environment of the vehicle,
each of the phase coherent FMCW LIDAR data points of the group indicating an instantaneous corresponding range and an instantaneous corresponding velocity for a corresponding one of the plurality of points in the environment, and each being generated based on a corresponding sensing event of the FMCW LIDAR monopulse component,
wherein the corresponding sensing events of the FMCW LIDAR monopulse component each comprise a first receiver sensing event at a first receiver of the phase coherent FMCW LIDAR monopulse component and a second receiver sensing event at a second receiver of the phase coherent FMCW LIDAR monopulse component;
determining that a subgroup, of the phase coherent FMCW LIDAR data points of the group, corresponds to an object of a particular classification, the determining based on both:
the corresponding ranges for multiple of the FMCW LIDAR data points of the subgroup, and
the corresponding velocities for multiple of the FMCW LIDAR data points of the subgroup;
determining a multi-dimensional pose of the object based on the subgroup of the FMCW LIDAR data points of the group; and
providing the determined multi-dimensional pose and an indication of the particular classification to a planning subsystem of the vehicle, wherein the planning subsystem of the vehicle generates a trajectory of the vehicle based on the multi-dimensional pose and the indication of the particular classification.

* * * * *